(12) United States Patent
Edge et al.

(10) Patent No.: US 10,194,265 B2
(45) Date of Patent: Jan. 29, 2019

(54) SYSTEMS AND METHODS FOR SUPPORTING POSITIONING BEACONS COMPATIBLE WITH LEGACY WIRELESS DEVICES

(71) Applicant: QUALCOMM Incorporated, San Diego, CA (US)

(72) Inventors: Stephen William Edge, Escondido, CA (US); Sven Fischer, Nuremberg (DE)

(73) Assignee: QUALCOMM Incorporated, San Diego, CA (US)

(*) Notice: Subject to any disclaimer, the term of this patent is extended or adjusted under 35 U.S.C. 154(b) by 21 days.

(21) Appl. No.: 15/275,096

(22) Filed: Sep. 23, 2016

(65) Prior Publication Data

US 2017/0339516 A1 Nov. 23, 2017

Related U.S. Application Data

(60) Provisional application No. 62/339,934, filed on May 22, 2016.

(51) Int. Cl.

| | |
|---|---|
| H04W 4/02 | (2018.01) |
| G01S 5/02 | (2010.01) |
| G01S 5/10 | (2006.01) |
| H04W 8/18 | (2009.01) |
| H04W 40/24 | (2009.01) |
| H04W 48/02 | (2009.01) |
| H04W 48/12 | (2009.01) |
| G01S 1/04 | (2006.01) |
| H04W 64/00 | (2009.01) |

(52) U.S. Cl.
CPC .......... *H04W 4/02* (2013.01); *G01S 1/04* (2013.01); *G01S 5/0205* (2013.01); *G01S 5/0236* (2013.01); *G01S 5/10* (2013.01); *H04W 8/186* (2013.01); *H04W 40/244* (2013.01); *H04W 48/02* (2013.01); *H04W 48/12* (2013.01); *H04W 64/00* (2013.01)

(58) Field of Classification Search
CPC ...... H04W 4/02; H04W 48/02; H04W 40/244
USPC ............ 455/456.1, 456.2, 524, 67.11, 404.1, 455/404.2; 370/252, 328, 329, 330, 331
See application file for complete search history.

(56) References Cited

U.S. PATENT DOCUMENTS 8,412,204 B1 * 4/2013 Oroskar ............ H04W 36/0083
455/404.2
9,491,575 B2 * 11/2016 Edge ....................... H04W 4/90
(Continued)

OTHER PUBLICATIONS

International Search Report and Written Opinion—PCT/US2017/024880—ISA/EPO —dated Jun. 21, 2017.

*Primary Examiner* — Congvan Tran
(74) *Attorney, Agent, or Firm* — Hunter Clark PLLC

(57) ABSTRACT

Disclosed are methods, devices, systems, nodes, apparatus, servers, computer-/processor-readable media, and other implementations, including a method, at a wireless node, for supporting positioning of one or more wireless devices. The method includes transmitting, by the wireless node configured as a positioning beacon, a first downlink signal for supporting positioning of the one or more wireless devices, and transmitting a second downlink signal that inhibits a receiving wireless device, from the one or more wireless devices, from sending uplink signals to the wireless node configured as the positioning beacon.

30 Claims, 9 Drawing Sheets

(56) References Cited

U.S. PATENT DOCUMENTS

| | | | |
|---|---|---|---|
| 2004/0152464 A1* | 8/2004 | Sugaya | H04L 63/08 455/435.1 |
| 2006/0030333 A1* | 2/2006 | Ward | G01S 5/0205 455/456.1 |
| 2008/0231511 A1* | 9/2008 | Montuno | G01S 5/06 342/387 |
| 2010/0120394 A1* | 5/2010 | Mia | H04W 64/003 455/404.2 |
| 2010/0273504 A1* | 10/2010 | Bull | G01S 5/02 455/456.1 |
| 2012/0287800 A1* | 11/2012 | Siomina | H04W 64/003 370/252 |
| 2013/0201848 A1* | 8/2013 | Kazmi | H04W 24/00 370/252 |
| 2015/0079942 A1* | 3/2015 | Kostka | H04W 4/21 455/411 |
| 2015/0223185 A1 | 8/2015 | Harris et al. | |
| 2015/0296475 A1 | 10/2015 | Burroughs et al. | |
| 2015/0312840 A1* | 10/2015 | Kazmi | H04W 40/244 455/456.2 |
| 2016/0095092 A1* | 3/2016 | Khoryaev | H04W 8/005 370/329 |
| 2016/0127871 A1* | 5/2016 | Smith | H04W 4/029 455/456.6 |
| 2016/0195601 A1* | 7/2016 | Siomina | G01S 5/0205 455/456.1 |
| 2016/0227370 A1* | 8/2016 | Gunnarsson | H04W 4/023 |
| 2016/0292978 A1* | 10/2016 | Lee | H04W 4/06 |
| 2016/0360370 A1 | 12/2016 | Edge et al. | |
| 2017/0059689 A1 | 3/2017 | Edge et al. | |
| 2017/0331670 A1* | 11/2017 | Parkvall | H04J 11/0079 |
| 2017/0339660 A1* | 11/2017 | Kazmi | H04B 17/309 |

\* cited by examiner

SYSTEMS AND METHODS FOR SUPPORTING POSITIONING BEACONS COMPATIBLE WITH LEGACY WIRELESS DEVICES

CROSS-REFERENCE TO RELATED APPLICATIONS

This Application claims the benefit of and priority to U.S. Provisional Application Ser. No. 62/339,934, entitled "SYSTEMS AND METHODS FOR SUPPORTING POSITIONING BEACONS COMPATIBLE WITH LEGACY WIRELESS DEVICES," filed May 22, 2016, which is assigned to the assignee hereof, and expressly incorporated herein by reference.

BACKGROUND

Position determination procedures include timing-based procedures in which timing information for signals transmitted from various wireless devices/nodes are received, measured, and used to derive location information. For example, in observed-time-difference of-arrival (OTDOA) based positioning, a mobile station may measure time differences in received signals from a plurality of network nodes (such as base stations). Because positions of the base stations can be known, the observed time differences may be used to calculate the location of the mobile device.

To further help location determination, Positioning Reference Signals (PRS) may be provided in order to improve OTDOA positioning performance (and/or performance of other position determination procedures). The measured time difference of arrival of the PRS from a reference cell (or other reference point such as a positioning beacon) and one or more neighboring cells is known as the Reference Signal Time Difference (RSTD). Using the RSTD measurements, the absolute or relative transmission timing of each cell, and based on the known position(s) of nodes (e.g. physical transmitting antennas for the reference and neighboring cells), the position of a receiving mobile device may be derived.

SUMMARY

In some variations, an example method at a wireless node for supporting positioning of one or more wireless devices is provided. The method includes transmitting, by the wireless node configured as a positioning beacon, a first downlink signal for supporting positioning of the one or more wireless devices, and transmitting a second downlink signal that inhibits a receiving wireless device, from the one or more wireless devices, from sending uplink signals to the wireless node configured as the positioning beacon.

Embodiments of the method may include at least some of the features described in the present disclosure, including one or more of the following features.

The first downlink signal and the second downlink signal may be configured according to 3GPP Long Term Evolution (LTE) standards.

The first downlink signal may include positioning reference signals detectable by the one or more wireless devices to facilitate location determination based on observed time difference of arrival (OTDOA).

The wireless node may be identified as a reference cell or a neighbor cell to support OTDOA computations using the positioning reference signals transmitted by the wireless node and additional positioning reference signals transmitted by at least one other wireless node.

Transmitting the second downlink signal may include generating the second downlink signal with one or more LTE information blocks omitted, with the one or more LTE information blocks omitted including, for example, a master information block (MIB) for a corresponding LTE cell, a system information block one (SIB1) for the corresponding LTE cell, and/or a system information block two (SIB2) for the corresponding LTE cell, and transmitting the second downlink signal with the one or more LTE information blocks omitted.

The second downlink signal may include a system information block one (SIB1), with the SIB1 including a closed subscriber group (CSG) indicator and a CSG identifier to which none of the one or more wireless devices belong.

The second downlink signal may include a system information block two (SIB2), with the SIB2 including an access-barring indicator.

The SIB2 including the access-barring indicator may include an indicator to, for example, bar sending an emergency communication by the receiving wireless device, and/or bar accessing by the receiving wireless device another non-emergency service.

In some variations, an example wireless node to support positioning of one or more wireless devices is provided. The wireless node includes one or more processors, and a transceiver, coupled to the one or more processors, configured to transmit, by the wireless node configured as a positioning beacon, a first downlink signal for supporting positioning of the one or more wireless devices, and transmit a second downlink signal that inhibits a receiving wireless device, from the one or more wireless devices, from sending uplink signals to the wireless node configured as the positioning beacon.

In some variations, an example apparatus to support positioning of one or more wireless devices is provided. The apparatus includes means for transmitting, by a wireless node configured as a positioning beacon, a first downlink signal for supporting positioning of the one or more wireless devices, and means for transmitting a second downlink signal that inhibits a receiving wireless device, from the one or more wireless devices, from sending uplink signals to the wireless node configured as the positioning beacon.

In some variations, example non-transitory computer readable media are provided, to support positioning of one or more wireless devices, that are programmed with instructions, executable on a processor, to transmit, by a wireless node configured as a positioning beacon, a first downlink signal for supporting positioning of the one or more wireless devices, and transmit a second downlink signal that inhibits a receiving wireless device, from the one or more wireless devices, from sending uplink signals to the wireless node configured as the positioning beacon.

Embodiments of the wireless node, the apparatus, and the non-transitory computer readable media may include at least some of the features described in the present disclosure, including at least some of the features described above in relation to the method.

In some variations, another example method is provided that includes receiving at a wireless device, from a wireless node configured as a positioning beacon, a first downlink signal supporting positioning of the wireless device, and receiving, from the wireless node, a second downlink signal that inhibits the wireless device from sending uplink signals to the wireless node.

In some variations, an example mobile wireless device is provided that includes one or more processors, and a transceiver, coupled to the one or more processors, configured to receive at the mobile wireless device, from a wireless node configured as a positioning beacon, a first downlink signal supporting positioning of the mobile wireless device, and receiving, from the mobile wireless node, a second downlink signal that inhibits the mobile wireless device from sending uplink signals to the wireless node.

In some variations, another example apparatus is provided that includes means for receiving at a wireless device, from a wireless node configured as a positioning beacon, a first downlink signal supporting positioning of the wireless device, and means for receiving, from the wireless node, a second downlink signal that inhibits the wireless device from sending uplink signals to the wireless node.

In some variations, further example non-transitory computer readable media are provided, that are programmed with instructions, executable on a processor, to receive at a wireless device, from a wireless node configured as a positioning beacon, a first downlink signal supporting positioning of the wireless device, and receive, from the wireless node, a second downlink signal that inhibits the wireless device from sending uplink signals to the wireless node.

Other and further objects, features, aspects, and advantages of the present disclosure will become better understood with the following detailed description of the accompanying drawings.

Figure 1:
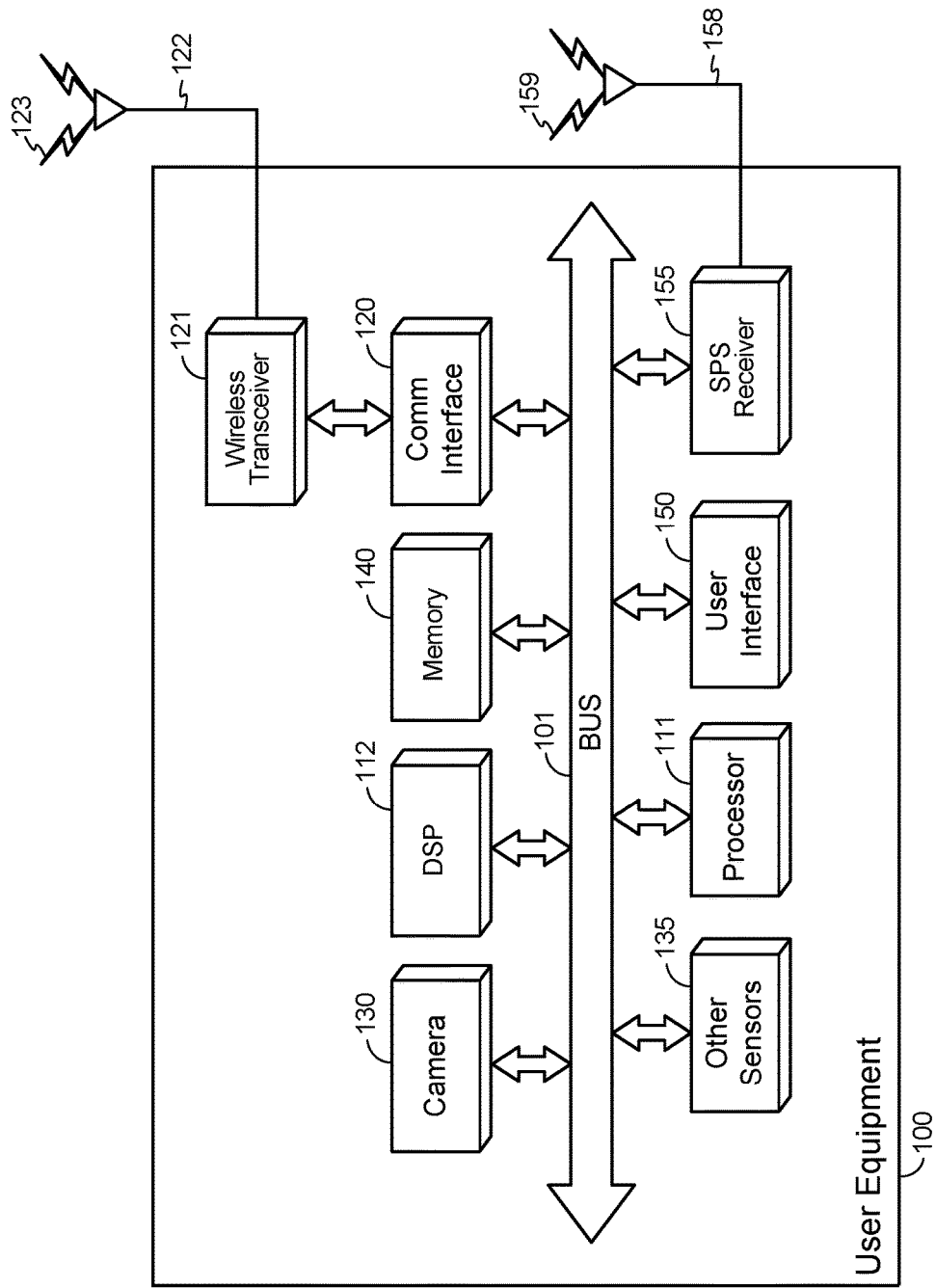
FIG. 1 is a block diagram of an example user equipment.

Like reference symbols in the various drawings indicate like elements, in accordance with certain example implementations. In addition, multiple instances of an element may be indicated by following a first number for the element with a hyphen and a second number. For example, multiple instances of an element 1000 may be indicated as 1000-1, 1000-2, 1000-3 etc. When referring to such an element using only the first number, any instance of the element is to be understood (e.g. elements 1000 in the previous example would refer to elements 1000-1, 1000-2 and 1000-3).

DETAILED DESCRIPTION

Positioning methods based on measurement of downlink cellular signals (e.g., PRS for OTDOA) can be improved in terms of adding greater coverage and/or providing higher accuracy through the deployment of additional beacon nodes (such as one or more location transmission units, or LTUs, of a terrestrial beacon system (TBS), which generally includes a network of ground-based transmitters, broadcasting signals for positioning purposes, and can therefore be supported in the E-UTRAN positioning architecture), which are configured to transmit positioning signals. Such positioning beacon nodes (also referred to as simply "positioning beacons") may transmit positioning signals such as the PRS used to support OTDOA positioning for Long Term Evolution (LTE) access which is defined in 3GPP Technical Specification (TS) 36.211. A positioning beacon may also transmit additional downlink signals such as a common reference signal (CRS) and system information blocks (SIBs) to allow UEs to better acquire and measure the positioning signals and use the positioning beacon as a reference for other measurements (e.g. as a reference cell in the case of OTDOA). However, positioning beacons may typically be configured to not provide any uplink capability (e.g., would not receive signals from UEs) and could not be used by UEs to gain network access.

One way to support positioning beacons would be for positioning beacons to transmit positioning signals (e.g., PRS) and other signals (e.g. CRS and one or more SIBs) that could be measured by existing legacy UEs that would treat and measure the beacons just like other base stations. As an example, a positioning beacon for OTDOA for LTE, might transmit PRS as defined for a normal eNodeB or for an eNodeB Remote Radio Head (RRH). A legacy user equipment (UE, also referred to as mobile station or mobile device) already capable of supporting OTDOA measurements for cells supported by normal eNodeBs and possibly cells supported by RRHs could then also measure the PRS for positioning beacons. This could allow a network operator to benefit immediately from deploying positioning beacons rather than benefiting only after some additional period in which UEs capable of measuring positioning signals transmitted by positioning beacons were deployed. However, a problem with enabling legacy UEs to measure positioning signals transmitted by positioning beacons is that the legacy UEs may treat and process positioning beacons as just regular eNBs or RRHs, and may therefore attempt to use them to gain cellular access. In some embodiments, this situation can be avoided by requiring that positioning beacons need to be supported only by new UEs that would not attempt cellular access. As an example, positioning beacons could transmit signals that are different from the signals transmitted by normal eNodeBs—e.g. such as by using a different type of CRS and/or other different physical channels. The new type of signals transmitted by the positioning beacons may include positioning signals (e.g. PRS similar to or the same as defined in 3GPP TS 36.211) that could enable support of OTDOA by new enhanced UEs that are able to acquire and measure the new type of signals. The new type of signals could also allow enhanced UEs to derive timing and to use a positioning beacon as both a frequency (and timing) source and as a reference cell for OTDOA. However, the new type of signals may not be capable of being acquired by legacy UEs. In such embodiments, a network operator would not be able to benefit from the deployment of positioning beacons to improve location determination functionality for legacy UEs.

In order to allow use of positioning beacons by legacy UEs, in some embodiments, positioning beacons could emulate cells in which normal uplink access by UEs is barred. This could be implemented through existing capability for different wireless access types. For example, in the case of LTE access, a cell may be barred by, for example: (1) omission of (i.e. not transmitting) a master information block (MIB), or a first or second system information block (SIB1 or SIB2); (2) inclusion of a closed subscriber group (CSG) indicator and CSG identity in the SIB1 that no UEs belong to (some adjustments may be necessary for emergency call situations); and/or (3) inclusion of access barring in the SIB2. In addition to allowing use of positioning beacons for positioning of legacy UEs, existing positioning signals could provided by a positioning beacon with additional positioning capability (e.g. by adding more PRS sub-frames in the case of LTE and/or by adding new types of PRS signaling). This could allow use of position signals (transmitted from positions beacons by) legacy UEs, and provide improved positioning signals (e.g. PRS with a higher duty cycle) for use by new UEs that support the additional capability.

Embodiments described herein include methods, systems, devices, computer readable media, and other implementations, including a method, generally performed at a wireless node (also referred to as a network node) supporting positioning of one or more wireless devices using positioning beacons. The method includes transmitting, by a wireless node configured as a positioning beacon, a first downlink signal for supporting positioning of one or more wireless devices. The first downlink signal may include positioning reference signals detectable by the one or more wireless devices to facilitate location determination based, for example, on observed time difference of arrival (OTDOA). The method also includes transmitting a second downlink signal that inhibits a receiving wireless device, from the one or more wireless devices, from sending uplink signals to the wireless node configured as the positioning beacon. The first and second downlink signals may each include multiple signal transmissions, and those various multiple signal transmissions may be transmitted in any order. Thus, transmission of signals such as the second downlink signal allows legacy UEs (e.g., existing mobile devices that may have been configured to attempt establishing uplink communication links with nodes from which they receive LTE signals) to receive and process positioning signals from deployed positioning beacons without attempting to establish uplink communication links with the positioning beacons (that are configured only for downlink communication). In some embodiments, transmitting the second downlink signal may include generating the second downlink signal with one or more LTE information blocks omitted, with the one or more LTE information blocks omitted including, for example, a master information block (MIB) for a corresponding LTE cell, a system information block one (SIB1) for the corresponding LTE cell, and/or a system information block two (SIB2) for the corresponding LTE cell, and transmitting the second downlink signal with the one or more LTE information blocks omitted. In some embodiments, the second downlink signal may include, for example, an SIB1 block, with the SIB1 block including a closed subscriber group (CSG) indicator and a CSG identifier to which none of the one or more wireless devices belong, and/or an SIB2 block with the SIB2 block including an access-barring indicator.

Also, in some embodiments, additional methods, systems, devices, nodes, media and other implementations are provided that include a method including receiving at a wireless device (e.g., a legacy UE), from a wireless node configured as a positioning beacon (e.g., configured only for downlink communication, without establishing uplink communication channels with mobile devices receiving its downlink communications), a first downlink signal supporting positioning of the wireless device, and receiving, from the wireless node, a second downlink signal that inhibits the wireless device from sending uplink signals to the wireless node.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "mobile device", a "subscriber terminal", a "subscriber station", a "user terminal" or UT, a "mobile terminal", a "mobile station", a SUPL enabled terminal (SET), a target device, a target UE, a device and variations thereof. A UE may be a cell phone, smart phone, laptop, tablet, asset tag, PDA, machine to machine (M2M) device or any other device that is enabled to communicate wirelessly with other UEs and/or with other entities via direct means and/or via one or more networks or one or more network elements. Generally, UEs can communicate with a core network via a RAN, and through the core network (or sometimes through the RAN) the UEs can be connected with external networks such as the Internet. The RAN may support wireless communication from UEs using cellular based radio technologies such as GSM, UMTS and LTE as defined by 3GPP or CDMA2000 as defined by 3GPP2. In some embodiments, 4G networks, Advanced LTE networks, Ultra Mobile Broadband (UMB) networks, and other types of cellular communications networks may also be implemented and used with the systems, methods, and other implementations described herein. A UE may also employ other mechanisms for connecting to the core network and/or the Internet such as over wired access networks, WiFi networks (e.g., based on IEEE 802.11, etc.), Bluetooth® wireless technology networks and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.).

The location of a UE may be referred to as a location estimate, position, position estimate, position fix, or fix, or by some other name, and may comprise location coordinates such as a latitude, longitude and possibly altitude. In some cases, location coordinates may be local and may then sometimes be referred to as x, y and z (or X, Y and Z) coordinates where an x (or X) coordinate refers to a horizontal distance in a particular direction (e.g. a distance East or West of a given known origin), a y (or Y) coordinate refers to a horizontal distance at right angles to the x (or X) direction (e.g. a distance North or South of a given known origin) and a z (or Z) coordinate refers to a vertical distance (e.g. a distance above or below local ground level). When computing the location of a UE, it is common to solve for local x, y and possibly z coordinates and then, if needed, convert the local coordinates into absolute ones (e.g. for latitude, longitude and altitude above or below mean sea level).

Referring to FIG. 1, a user equipment (UE) 100 is illustrated for which various techniques herein can be utilized. The UE 100 includes a processor 111 (or processor core) and memory 140. The UE depicted may be a legacy UE (e.g., a UE that, in response, to detection of various downlink LTE signaling from a network node, would ordinarily be configured to attempt to establish uplink communication with the transmitting network node), or it may be an enhanced-positioning UE (also referred to here as an enhanced UE or a new enhanced UE) configured to receive additional downlink positioning communications from, for example, a positioning beacon (e.g., a location transmission unit (LTU) of a terrestrial beacon system (TBS)). As described herein, the UE 100, be it a legacy UE or otherwise, is configured to detect downlink signals from positioning beacons that include signals to inhibit UEs from sending uplink signals to such positioning beacons. The UE 100 may optionally include a trusted environment operably connected to the memory 140 by the public bus 101 or a private bus (not shown). The UE 100 may also include a communication interface 120 and a wireless transceiver 121 configured to send and receive wireless signals 123 via a wireless antenna 122 over a wireless network. The wireless transceiver 121 is connected to the bus 101 via the communication interface 120. Here, the UE 100 is illustrated as having a single wireless transceiver 121. However, the UE 100 can alternatively have multiple wireless transceivers 121 and/or multiple wireless antennas 122 to support multiple communication standards such as WiFi, CDMA, Wideband CDMA (WCDMA), Long Term Evolution (LTE), Bluetooth® short-range wireless communication technology, etc.

The communication interface 120 and/or wireless transceiver 121 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, control information, overhead information, data, etc.

The UE 100 may also include a user interface 150 (e.g., display, graphical user interface (GUI)), and a Satellite Positioning System (SPS) receiver 155 that receives SPS signals 159 (e.g., from SPS satellites) via an SPS antenna 158 (which may be the same antenna as wireless antenna 122 or may be different). The SPS receiver 155 can communicate with a single global navigation satellite system (GNSS) or multiple such systems. A GNSS can include, but is not limited to, Global Positioning System (GPS), Galileo, Glonass, Beidou (Compass), etc. SPS satellites are also referred to as satellites, space vehicles (SVs), etc. The SPS receiver 155 measures the SPS signals 159 and may use the measurements of the SPS signals 159 to determine the location of the UE 100. The processor 111, memory 140, Digital Signal Processor (DSP) 112 and/or specialized processor(s) (not shown) may also be utilized to process the SPS signals 159, in whole or in part, and/or to calculate the location of the UE 100, in conjunction with SPS receiver 155. Alternatively, the UE 100 may support transfer of the SPS measurements to a location server (e.g., E-SMLC) that computes the UE location instead. Storage of information from the SPS signals 159 or other location signals is performed using a memory 140 or registers (not shown). While only one processor 111, one DSP 112 and one memory 140 are shown in FIG. 1, more than one of any, a pair, or all of these components could be used by the UE 100. The processor 111 and DSP 112 associated with the UE 100 are connected to the bus 101.

The memory 140 can include a non-transitory computer-readable storage medium (or media) that stores functions as one or more instructions or code. Media that can make up the memory 140 include, but are not limited to, RAM, ROM, FLASH, disc drives, etc. In general, the functions stored by the memory 140 are executed by general-purpose processor(s) 111, specialized processors, or DSP(s) 112. Thus, the memory 140 is a processor-readable memory and/or a computer-readable memory that stores software (programming code, instructions, etc.) configured to cause the processor(s) 111 and/or DSP(s) 112 to perform the functions described. Alternatively, one or more functions of the UE 100 may be performed in whole or in part in hardware.

A UE 100 can estimate its current position within an associated system using various techniques, based on other communication entities within view and/or information available to the UE 100. For instance, the UE 100 can estimate its position using information obtained from access points (APs) associated with one or more wireless local area networks (WLANs), personal area networks (PANs) utilizing a short-range wireless communication technology such as Bluetooth® wireless technology or ZIGBEE®, etc., Global Navigation Satellite System (GNSS) or other Satellite Positioning System (SPS) satellites, and/or map data obtained from a map server or other server (e.g. an E-SMLC or SLP). In some cases, a location server, which may be an E-SMLC, SLP or Standalone Serving Mobile Location Center (SAS), may provide assistance data to the UE 100 to enable or assist the UE 100 to acquire signals (e.g. signals from WLAN APs, cellular base stations, GNSS satellites) and make location related measurements using these signals. The UE 100 may then provide the measurements to the location server to compute a location estimate (which may be known as "UE assisted" positioning) or may compute a location estimate itself (which may be known as "UE based" positioning) based on the measurements and possibly based also on other assistance data provided by the location server (e.g. such as orbital and timing data for GNSS satellites or the precise location coordinates of WLAN APs and/or cellular base stations for use in OTDOA and AFLT positioning).

In one embodiment, the UE 100 may include a camera 130 (e.g., front and/or back facing) such as, for example, complementary metal-oxide-semiconductor (CMOS) image sensors with appropriate lens configurations. Other imaging technologies such as charge-coupled devices (CCD) and back side illuminated CMOS may be used. The camera 130 may be configured to obtain and provide image information to assist in positioning of the UE 100. In an example, one or more external image processing servers (e.g. remote servers) may be used to perform image recognition and provide location estimation processes. The UE 100 may include other sensors 135 which may also be used to compute, or used to assist in computing, a location for the UE 100. Sensors 135 may include inertial sensors (e.g. accelerometers, gyroscopes, magnetometers, a compass, any of which may be implemented based on micro-electro-mechanical-system (MEMS), or based on some other technology), as well as a barometer, thermometer, hygrometer and other sensors.

As noted, and as will be discussed in greater detail below, in some embodiments the UE 100 may be a legacy UE configured to receive (e.g., via the wireless transceiver 121), from a wireless node configured as a positioning beacon, a first downlink signal supporting positioning of the UE 100 (e.g., the first downlink signal may include multiple signals, such as multiple positioning reference signals detectable by one or more wireless devices to facilitate location determination based on observed time difference of arrival (OTDOA)). Such a legacy UE may also be configured to receive, from the wireless node, a second downlink signal (which may be included in a different transmission, that may be earlier or later, than the transmission for the first downlink signal, or may be included in the same transmission as the first downlink signal) that inhibits the UE 100 from sending uplink signals to the wireless node. A legacy UE so configured may therefore be capable of processing positioning signals from positioning beacons (such as LTU's of terrestrial beacon systems), and, thus, positioning beacons may be deployed to support legacy UEs as well new generation UEs (which may be implemented for enhanced positioning capabilities to, among other things, process and use additional positioning signals from positioning beacons). A legacy UE may, for example, be implemented to avoid establishing an uplink communication link with a positioning beacon when it detects in downlink signals data indicating that the transmitting positioning beacon should not be accessed. For example, the legacy UE may be configured to detect that one or more LTE information blocks of the second downlink signal (the second downlink signal may be configured to include control signals and information) are omitted, with such one or more LTE information blocks omitted including, for example, a master information block (MIB) for a corresponding LTE cell, a system information block one (SIB1) for a corresponding LTE cell, and/or a system information block two (SIB2) for a corresponding LTE cell.

Figure 2:
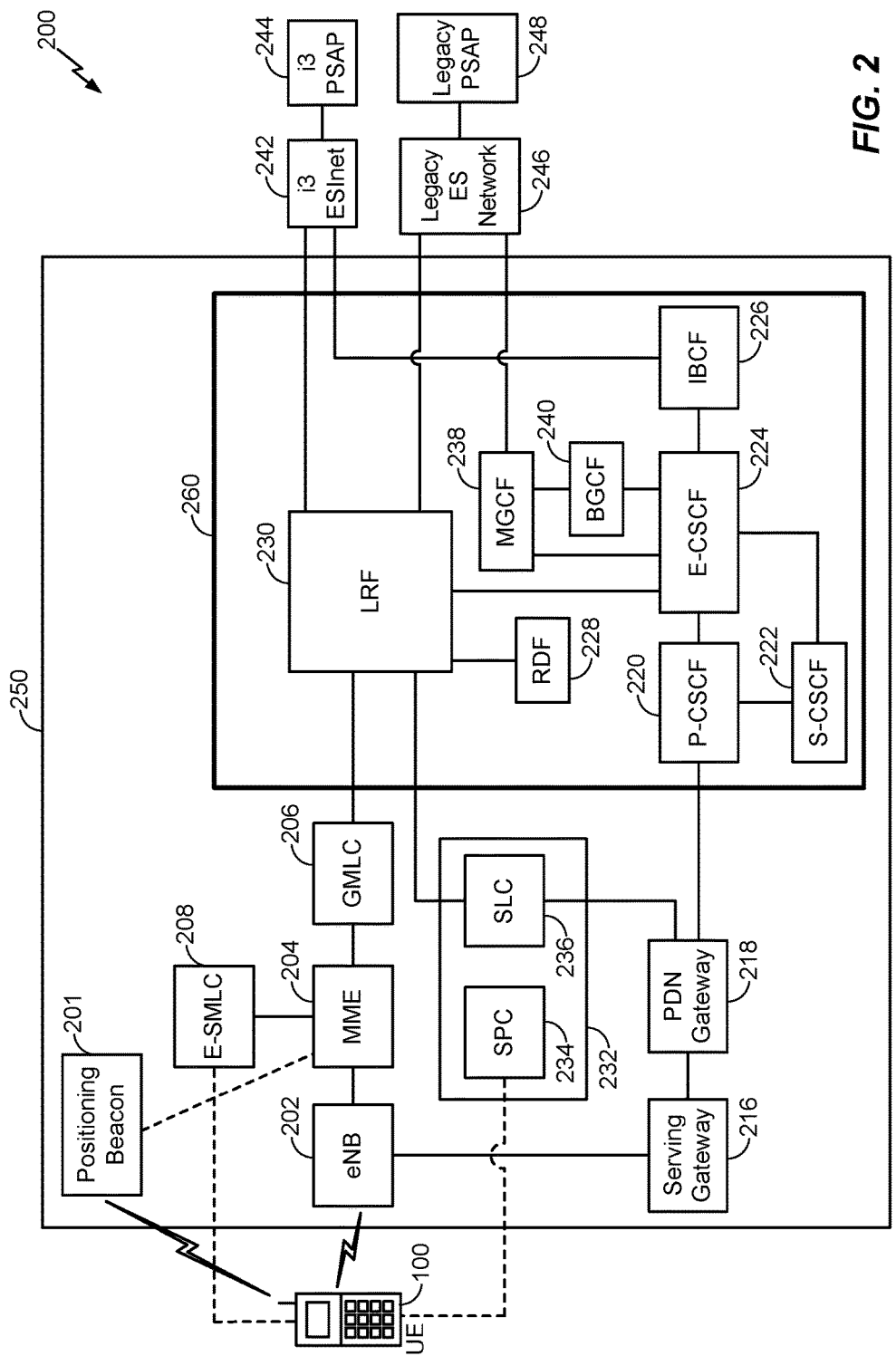
FIG. 2 is a diagram of an example architecture for terrestrial positioning with 3GPP long term evolution (LTE) access.

Referring to FIG. 2, with further reference to FIG. 1, an architecture 200 for supporting positioning of the UE 100 with 3GPP Long Term Evolution (LTE) access for a network 250 is shown. The network 250 may be an Evolved Packet System (EPS) that supports LTE access (e.g. by the UE 100) and possibly other access types (not shown in FIG. 2) such as CDMA2000, Wideband CDMA (WCDMA) and/or WiFi. The UE 100 may communicate with a serving evolved Node B (eNodeB or eNB) 202 in a radio access network (RAN) to obtain communication services from the network 250. The RAN may include other network entities not shown in FIG. 2 for simplicity and may also be referred to as an Evolved Universal Terrestrial Radio Access Network (E-UTRAN). The eNB 202 may also be referred to as a Node B, a base station, an access point, etc. The terms "access point" and "base station" are used interchangeably herein. In some embodiments, a positioning beacon 201 may transmit downlink positioning signals (e.g., sub-frames that include positioning reference signals, or PRS, based on which location determination operation may be performed) without receiving uplink communication from devices receiving the downlink positioning signals. The positioning beacon 201 may also be implemented to transmit downlink control signals to inhibit/prevent receiving UEs such as the UE 100 from sending uplink communication signals to the positioning beacon 201 configured to transmit positioning signals. The UE 100 may: (i) receive signals from eNB 202 and from other base stations (e.g. other eNBs) and APs in network 250, including from positioning beacon 201; (ii) obtain the identities of the source eNBs and other base stations and/or positioning beacon 201 and/or obtain the identities of the source cells from the received signals and/or the identity of an associated cell (e.g. simulated cell) in the case of positioning beacon 201; and/or (iii) obtain measurements of the received signals such as measurements of time of arrival (TOA), reference signal time difference (RSTD) for OTDOA positioning, pilot phase for AFLT positioning, and/or signal strength (e.g. received signal strength indication (RSSI)), signal quality (e.g. signal to noise ratio (S/N)), and/or signal round trip propagation time (RTT) for enhanced cell ID (ECID) positioning. The eNB identities, base station identities, positioning beacon identity and/or cell identities and the different signal measurements may be used to derive a location estimate for the UE 100 (e.g. by the UE 100 or by a location server such as E-SMLC 208 or SLP 232). While only one eNB 202 and one positioning beacon 201 are depicted in FIG. 2, the architecture 200 (e.g. network 250) may include multiple eNBs, multiple positioning beacons and/or other base stations and/or APs, each with one or more antenna systems such as used with Distributed Antenna Systems (DAS), Remote Radio Heads (RRHs), repeaters and relays.

The eNB 202 and optionally the positioning beacon 201 may communicate with a serving MME 204 for the UE 100, which may perform various control functions such as mobility management, PDN gateway selection, authentication, bearer management, etc. The MME 204 may communicate with an Enhanced Serving Mobile Location Center (E-SMLC) 208 and a Gateway Mobile Location Center (GMLC) 206. The E-SMLC 208 may support UE-based, UE-assisted, network-based and/or network-assisted positioning methods for UEs including the UE 100 and may support one or more MMES. The E-SMLC 208 may support, for example, the 3GPP control plane location solution for LTE access as defined in 3GPP Technical Specifications (TSs) 23.271 and 36.305. The E-SMLC 208 may also be referred to as a location server (LS), a Stand Alone SMLC (SAS), etc. The GMLC 206 may perform various functions to support location services and provide services such as subscriber privacy, authorization, authentication, billing, etc. A Location Retrieval Function (LRF) 230 may communicate with GMLC 206 and may route or help route IP-based emergency calls to a Public Safety Answering Points (PSAPs) such as the i3 ESInet 242 and i3 PSAP 244, as well as legacy systems such as the legacy Emergency Services (ES) network 246 and the legacy PSAP 248. LRF 230 may also support location requests from PSAPs (e.g. PSAPs 244 and 248) for UEs (e.g. the UE 100) that are making emergency calls and may obtain locations for these UEs and return the locations to the requesting PSAPs. In order to support the routing and location functions that LRF 230 performs, LRF 230 may be configured to request the locations of different target UEs (e.g. the UE 100) from a GMLC such as GMLC 206. In that case, GMLC 206 may transfer any location request for a target UE (e.g. the UE 100) to an MME such as MME 204 which may transfer the request to an E-SMLC such as E-SMLC 208. The E-SMLC (e.g. E-SMLC 208) may then obtain location related measurements for the target UE (e.g. the UE 100) from the serving eNB for the target UE (e.g. eNB 202) and/or from the target UE, compute or verify any location estimate for the target UE and return the location estimate via the MME and GMLC (e.g. MME 204 and GMLC 206) to LRF 230. LRF 230 may also or instead be configured to request the locations of different target UEs (e.g. the UE 100) from a SUPL Location Platform (SLP) such as SLP 232 described next. The SLP 232 may include a SUPL Positioning Center (SPC) 234 and a Secure User Plane Location (SUPL) Location Center (SLC) 236, and may be configured to communicate location information with the LRF 230 and support the SUPL user plane location solution defined by the Open Mobile Alliance (OMA) in order to obtain the locations of UEs such as the UE 100.

In order to support positioning of a UE such as the UE 100, E-SMLC 208 and SLP 232 may each use the LTE Positioning Protocol (LPP) defined in 3GPP TS 36.355 and/or the LPP Extensions (LPPe) protocol defined by OMA in which LPP and/or LPPe messages are exchanged between E-SMLC 208 or SLP 232 and the target UE (e.g. the UE 100) that is being positioned. In the case of E-SMLC 208, LPP and/or LPPe messages exchanged with a target UE may be transferred as signaling via the serving MME and the serving eNB for the target UE (e.g. eNB 202 and MME 204 if the target UE is the UE 100). In the case of SLP 232, LPP and/or LPPe messages exchanged with a target UE may be transferred as data using IP transport via a PDN Gateway, Serving Gateway and serving eNB for the target UE (e.g. PDN Gateway 218, Serving Gateway 216, both described next, and eNB 202 if the target UE is the UE 100). An LPP message that is combined with an LPPe message (e.g. with the LPPe message embedded inside the LPP message) may be referred to as an LPP/LPPe message. Similarly, the combination of the LPP and LPPe protocols (e.g. as supported by exchanging LPP/LPPe messages between the UE 100 and E-SMLC 208 or SLP 232) may be referred to as an LPP/LPPe protocol.

A Serving Gateway 216 may perform various functions related to IP data transfer for UEs such as data routing and forwarding, mobility anchoring, etc. A Packet Data Network (PDN) Gateway 218 may perform various functions such as maintenance of data connectivity for UEs, IP address allocation, support of access to external data networks and/or a data intranet for network 250 etc. An IP Multimedia Subsystem (IMS) 260 for network 250 may include various network entities to support IMS services such as Voice-over-IP (VoIP) calls and VoIP emergency calls. The IMS 260 may include a Proxy Call Session Control Function (P-CSCF) 220, a Serving Call Session Control Function (S-CSCF) 222, an Emergency Call Session Control Function (E-CSCF) 224, a Breakout Gateway Control Function 240, a Media Gateway Control Function (MGCF) 238, an Interconnection Border Control Function (IBCF) 226, a Routing Determination Function (RDF) 228 and the LRF 230.

In operation, the network 250 may utilize LTE interfaces and protocols for control plane location. The LPP protocol, either alone or combined with the LPPe protocol, may be used over the Uu interface between the UE 100 and the eNB 202 for positioning of the UE 100 by the E-SMLC 208. LPP or LPP/LPPe messages may be transferred (as previously described) between the UE 100 and the E-SMLC 208 via the MME 204 and the eNB 202 for the UE 100 as described in 3GPP TSs 23.271 and 36.305. The E-SMLC 208 may be configured to request (e.g. by sending an LPP/LPPe Request Location Information message to the UE 100), and the UE 100 may be configured to provide (e.g. by sending an LPP/LPPe Provide Location Information message to E-SMLC 208) the signal measurements (e.g. RSSI, RTT, RSTD measurements) and identities of visible cells.

In an alternative embodiment, either (i) the LPP protocol alone without LPPe or (ii) the RRC protocol defined in 3GPP 36.331 may be used over the Uu interface between the UE 100 and the serving eNB 202 for positioning of the UE 100 by the E-SMLC 208. In the case of LPP (alternative (i)), LPP messages (without LPPe messages) may be transferred between the UE 100 and the E-SMLC 208 via the MME 204 and the serving eNB 202 for the UE 100 as described in 3GPP TSs 23.271 and 36.305. In the case of RRC (alternative (ii)), RRC messages may be transferred between the UE 100 and the serving eNB 202 and LTE Positioning Protocol A (LPPa) messages (defined in 3GPP TS 36.455) may be transferred between eNB 202 and E-SMLC 208 via the MME 204 for the UE 100 as described in 3GPP TSs 23.271 and 36.305. In an example, the E-SMLC 208 may be configured to request (e.g. by sending an LPP Request Location Information message to the UE 100 or an LPPa request message to eNB 202 which may cause eNB 202 to send an RRC request message to UE 100), and the UE 100 may be configured to provide (e.g. by sending an LPP Provide Location Information message to E-SMLC 208 or an RRC response to eNB 202 which causes eNB 202 to send an LPPa response to E-SMLC 208) the signal measurements (e.g., RSTD measurements) and identities of visible cells.

A Location Services (LCS) Application Protocol (LCS-AP) defined in 3GPP TS 29.171 may be used over an SLs interface between the MME 204 and the E-SMLC 208 to enable the MME 204 to request location information for the UE 100 from the E-SMLC 208 using the 3GPP control plane solution. An Evolved Packet Core (EPC) LCS Protocol (ELP) defined in 3GPP TS 29.172 may be used over an SLg interface between the MME 204 and the GMLC 206 to enable the GMLC 206 to request and obtain location information for the UE 100 from MME 204 using the 3GPP control plane solution.

The network 250 may also utilize interfaces and protocols for SUPL User Plane Location. A Lup interface as defined in OMA-AD-SUPL-V2_0 may be used between the UE 100 (referred to as a SUPL Enabled Terminal (SET)) and the SLP 232 to support positioning of the UE 100 using the OMA SUPL user plane solution. The Lup interface enables exchange of UserPlane Location Protocol (ULP) messages, defined in Open Mobile Alliance's OMA-TS-ULP-V2_0_3, between the UE 100 and the SLP 232. The SLP 232 may be a Home SLP (H-SLP) and reside in the home network of a UE (e.g. applicable to the UE 100 if network 250 is the home network for the UE 100) or may be a Discovered SLP (D-SLP) or Emergency SLP (E-SLP). A D-SLP may be used to position the UE 100 in any network (e.g. applicable if network 250 is not the home network for the UE 100) and an E-SLP may be used to position the UE 100 if the UE 100 is establishing or has established an emergency call (e.g. a VoIP emergency call via IMS 260 to i3 PSAP 244 or legacy PSAP 248). SLP 232 may be split into the SLC 236 and the SPC 234 which may be separate logical functions of a single physical SLP 232 or separate physical entities. The SLC 236 is configured to establish and control a SUPL session with the UE 100. The SPC 234 is configured to obtain a location of the UE 100. The endpoint for any ULP message is then either the SLC 236 or the SPC 234 depending on whether the ULP message is used for control and service provision or for positioning. In the case of the UE 100 (e.g., with LTE access), the ULP messages used for positioning typically each encapsulate one or more LPP messages. Each encapsulated LPP message can further encapsulate one LPPe message, thereby enabling exchange of LPP and/or LPP/LPPe positioning protocol messages between the UE 100 and the SLP 232 as previously described. To support accurate location, LPP/LPPe may be used to enable the SPC 234 to request, and the UE 100 to return the same information (e.g. cell identities and RSTD measurements) as described for control plane location described above.

As noted, in some embodiments, the serving eNB 202 and/or the positioning beacon 201, may be configured to transmit identical or similar positioning signals and other identical or similar signals using a number of different antennas at different locations which may sometimes be referred to as "simulcast" or "broadcast." Examples of radio sources that can broadcast (or simulcast) similar or identical signals include a Distributed Antenna System (DAS), Remote Radio Heads (RRHs), repeaters and relays. With a DAS, a single base station transmits and receives signals via a number of separate low power antenna elements which may be connected to the base station via splitters, feeders (e.g. coax cable) and possibly repeater amplifiers. With RRHs, a single base station may have a collocated main antenna and a number of separate remote radio heads (RRHs) which each comprise a separate radio transceiver, with its own antenna, that is connected to the main base station by wireless or wireline means (e.g. using fiber optic cable). With a repeater or relay, radio signals broadcast by a main base station are received by the repeater or relay, amplified and re-broadcast and signals received by the repeater or relay from cellular devices may be amplified and re-broadcast to the base station. Typically, signals sent by the different antenna elements in a DAS are identical copies of one another. In the case of RRHs, the signals may be identical or the base station may introduce differences that would allow a UE to determine the source RRH. In the case of relays and repeaters, the signals may be identical or the relay or repeater may introduce differences. A positioning beacon 201 may employ RRHs or may act as a repeater or relay when transmitting positioning and other signals but may also introduce differences in the positioning signals and other signals transmitted by each antenna (e.g. the antenna for each RRH) such that a receiving UE 100 can identify the source antenna (e.g. source RRH), which may enable lower cost deployment of positioning beacons.

Figure 3:
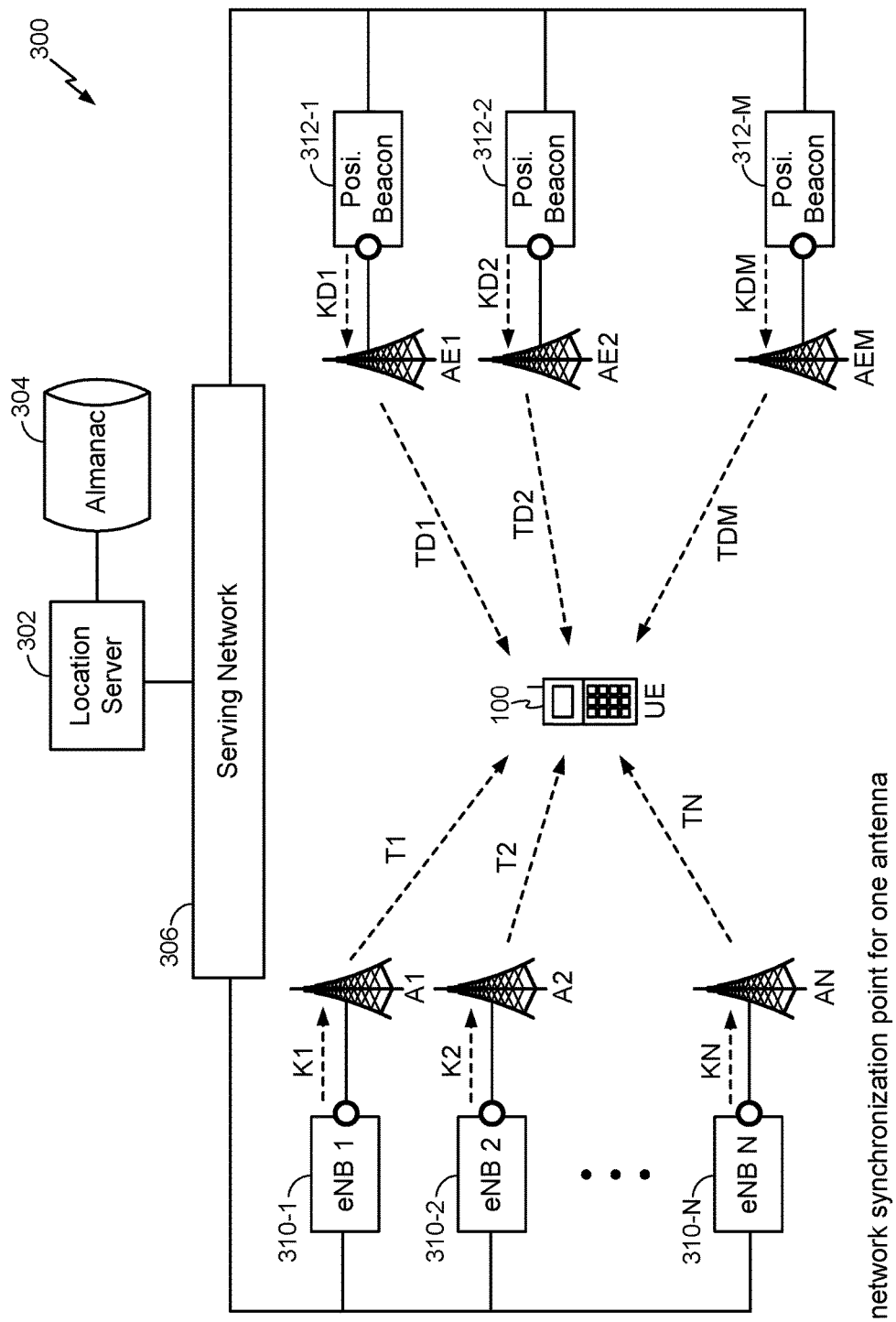
FIG. 3 is a diagram of high level architecture of an example wireless communication network for support positioning using one or more deployed positioning beacons.

With reference now to FIG. 3, a high level architecture of an example wireless communication network 300 to support positioning using one or more deployed positioning beacons is shown. The wireless communication system 300 includes a location server 302 and an almanac 304. The location server 302 and almanac 304 may be included as part of a serving network 306 or may be attached to or reachable from a serving network 306. For example, the serving network 306 may correspond to network 250 in FIG. 2, and the location server 302 may correspond to the E-SMLC 208 or to the SLP 232 in the network 250, or may be another location server such as a Standalone Serving Mobile Location Center (SAS). The serving network 306 may include one or more access points and/or base stations such as eNB 1 310-1, eNB 2 310-2, and eNB N 310-N. The serving network 306 may further include one or more positioning beacons such as positioning beacons 312-1, 312-2, and 312-M. The positioning beacons 312 support one-way communication (e.g., broadcast communication) so as to transmit positioning signals (e.g., PRS, as will more particularly be discussed below) without receiving uplink communication from UEs (such as the UE 100 depicted in FIGS. 1-3). In some embodiments, the positioning beacons 312 may be configured to transmit positioning signals through, for example, remote radio heads (RRHs) that act as beacons only. The positioning beacons 312 may be implemented using an eNB node configured for one-way communication. There may be other nodes (eNBs and/or positioning beacons) not explicitly shown in FIG. 3, such as eNBs n 310-$n$ with n between 3 and N−1 and/or positioning beacons 312-$m$ with m between 3 and M−1. Any one of the depicted eNBs 310 may correspond, or be implemented similarly to, the eNB 202 in FIG. 2. Any one of the depicted positioning beacons 312 may correspond, or be implemented similarly to, the positioning beacon 201 in FIG. 2. Each of the nodes may be operably connected to one or more antennas. The antennas comprise A1, A2, . . . AN in the case of eNBs 1, 2 . . . N, respectively, and AE1, AE2, . . . AEM, in the case of the positioning beacons 312. An almanac 304 represents a database structure which may belong to serving network 306 and/or to location server 302 and may, in some embodiments, be part of the location server 302 (e.g. contained in memory in the location server 302). The almanac 304 is configured to store identification, location and other information for the access points, base stations (e.g. eNBs), positioning beacons and antennas within the serving network 306, and may comprise a Base Station Almanac (BSA).

In some embodiments, the serving network 306 can employ a set of synchronization points (depicted as small circles in FIG. 3), one for each antenna A1, A2, AN, or one for each of antennas AE1, AE2, and AEM. Each synchronization point corresponds to a location along the signal transmission path for the signals transmitted by one antenna at which the signal timing is synchronized exactly or almost exactly to a common time (e.g. using GPS receivers) that is applicable to all the synchronization points. For example, in the case of LTE, the synchronization points can synchronize the start of each new set of 1024 LTE downlink system frames, the start of each 10 millisecond (ms) LTE downlink radio frame, or just the start of each new 1 ms LTE downlink subframe to the same time (e.g. same global time) for each cell (e.g. the cells associated with eNBs 310 and positioning beacons 312 in FIG. 3) and for each radio antenna in each cell. A synchronization point may correspond to signal transmission at an antenna or to signal propagation past some point prior to reaching the antenna such as a signal output jack from an eNB or an intermediate signal amplifier.

FIG. 3 shows N nodes eNBs 310-1, 310-2, 310-N, labelled 1 to N, that each may support a single cell using a single antenna labelled A1, A2 to AN. The positioning beacons 312-1, 312-2, 312-M may also each support a single cell using a single antenna labelled AE1, AE2 to AEM, respectively. A cell C supported by or associated with any positioning beacon 312 may correspond to a geographic coverage area over which positioning signals and other signals transmitted by the positioning beacon 312 can be received and measured by the UE 100. The cell C may be assigned one or more identities (e.g. by the operator of the communication network 300) which may be indicated in signals (e.g. positioning signals and/or other signals) transmitted by the positioning beacon 312. The identity or identities for the cell C may be similar to the identities of the cells supported by the eNBs 310 and may be indicated in the same or in a similar manner in signals transmitted by the positioning beacon 312 as are the identity or identities of cells supported by the eNBs 312. For example, in the case of LTE access, the cell C for any positioning beacon 312 may have a physical cell identity which may be an integer in the range 0-511 and/or a global cell identity. This similarity of cell identities for the positioning beacons 312 to those for the eNBs 310 may enable a legacy UE 100 to treat a positioning beacon 312 the same as an eNB 310 with regard to acquiring and measuring downlink signals (e.g. positioning signals) from the positioning beacon 312.

In a first example, referred to as example EX1 which may be implemented using the wireless communication network 300 of FIG. 3, the location server 302 may be configured to instruct the UE 100 to perform OTDOA measurements using a positioning beacon (e.g. the positioning beacon 312-1) as a reference cell, with the cells corresponding to eNBs 310 and other positioning beacons 312 (e.g. excluding positioning beacon 312-1) as neighbor cells, and to return the OTDOA RSTD measurements to the location server 302. In another example, referred to as EX2, implemented using the wireless communication network 300 of FIG. 3, the location server 302 may be configured to instruct the UE 100 to perform OTDOA measurements using a cell for an eNB (e.g.

eNB 310-1) as a reference cell, with the cells corresponding to other eNBs 310 (e.g. excluding eNB 310-1) and the positioning beacons 312 as neighbor cells, and to return the OTDOA RSTD measurements to the location server 302. In these examples, the line of sight (LOS) signal propagation times from each antenna to the UE 100 may be denoted as Tn for each eNB antenna An, and TDm for each positioning beacon antenna AEm. The UE 100 may then measure up to N+M−1 RSTDs between the reference cell, corresponding to the reference eNB 310 in example EX2 or the reference positioning beacon 312 in example EX1, and each of the N+M−1 neighbor cells, for either N−1 eNBs 310 and M positioning beacons 312 in the example EX2 or N eNBs 310 and M−1 positioning beacons 312 in the example EX1. The N+M−1 RSTDs (if measured correctly with little or no multipath errors) will be related to the signal propagation delays from the different antennas to the UE 100 and to the signal propagation delays inside the network to the different antennas. As an example, in the case of the example EX2 and where the reference cell corresponds to the cell for eNB 310-1, the N+M−1 RSTDs will be given by the following equations (which can be inferred from the arrangement shown in FIG. 3):

$$RSTDn = (Tn+Kn)-(T1+K1) \ (2 \leq n \leq N) \quad (1)$$

$$RSTD\#m = (TDm+KDm)-(T1+K1) \ (1 \leq m \leq M) \quad (2)$$

Here antenna A1 is measured by the UE for the reference cell 310-1 and RSTDn in equation (1) is the RSTD between antenna A1 and the antenna An for each neighbor cell associated with each eNB 310-$n$. Kn is the added internal signal propagation delay for antenna An from the point of network signal synchronization for antenna An to the antenna An (e.g. including propagation along any transmission feeds, signal amplifiers and other elements in the transmission path to antenna An). If the synchronization point for antenna An is antenna An, then Kn is zero. Typically, Kn will be constant and can be measured and/or calculated by the operator for serving network 306.

Similarly, in equation (2), RSTD#m is the RSTD between antenna A1 and the antenna AEm for each neighbor cell associated with each positioning beacon 312-$m$. KDm is the added internal signal propagation delay for each antenna AEm from the point of network signal synchronization for antenna AEm to the antenna element AEm. KDm will also normally be constant and capable of being measured and/or calculated by a network operator. For a network in which OTDOA (e.g. PRS) signals are not synchronized but where transmission time differences between different antennas can be measured or calculated, the parameters Kn and KDm can represent the difference in transmission time from each antenna An and antenna AEm and some universal time like UTC time or GPS time.

In order to solve for the X,Y,Z coordinates of the UE (e.g. with X being a latitude, Y a longitude and Z an altitude or X,Y,Z being local Cartesian coordinates), the following equations can be used:

$$[(Xn-x)^2+(Yn-y)^2+(Zn-z)^2]^{1/2}-[(X1-x)^2+(Y1-y)^2+(Z1-z)^2]^{1/2}=c(Tn-T1) \ (2 \leq n \leq N) \quad (3)$$

$$[(xm-x)^2+(ym-y)^2+(zm-z)^2]^{1/2}-[(X1-x)^2+(Y1-y)^2+(Z1-z)^2]^{1/2}=c(TDm-T1) \ (1 \leq m \leq M) \quad (4)$$

Where:
c=signal propagation speed over the air interface (i.e. light speed);
Xn, Yn, Zn=X,Y,Z coordinates of antenna An ($1 \leq n \leq N$);
xm, ym, zm=X,Y,Z coordinates of antenna AEm ($1 \leq m \leq M$);
x, y, z=X,Y,Z coordinates of the UE.

Equation (3) applies for the N−1 neighbor antennas An ($2 \leq n \leq N$) for the eNBs 310 and is based only on geometry. The terms (Tn−T1) in equation (3) can be obtained from the RSTD measurements using equation (1). Similarly, equation (4) applies for the M neighbor antennas AEm ($1 \leq m \leq M$) for the M positioning beacons 312 and is based only on geometry. The terms (TDm−T1) in equation (4) can be obtained from the RSTD measurements using equation (2). Hence 3 RSTD measurements for 3 neighbor eNB and/or positioning beacon antennas would be enough to solve for x,y,z (assuming the antenna coordinates and the propagation delay constants Kn and KDm are known). This means the location of the UE 100 can be obtained if N+M−1≥3. Typically, some extra measurements to improve accuracy so N+M−1>3 may be preferred. In the case that N<4 (or N<3 for just x,y), there will not be enough eNBs 310 to obtain the location of the UE 100 without using some of the M positioning beacons 312. In this case, the ability to use some or all of the RSTD measurements for the M positioning beacons 312 in equation (2) may be critical to locating the UE 100. This is an example of why enabling the positioning beacons 312 to be used for OTDOA positioning of a legacy UE 100 may be of significant benefit.

It should be noted that while a location server 302 may obtain the location of the UE 100 as exemplified above, the technique can also be used at the UE 100 to calculate its location if a location server 302 and/or other network entity (e.g. a base station) provides the UE 100 with the necessary information to perform the location computation such as the location coordinates of the neighbor eNBs and/or neighbor positioning beacons (e.g. in the form of assistance data such as BSA).

Figure 4:
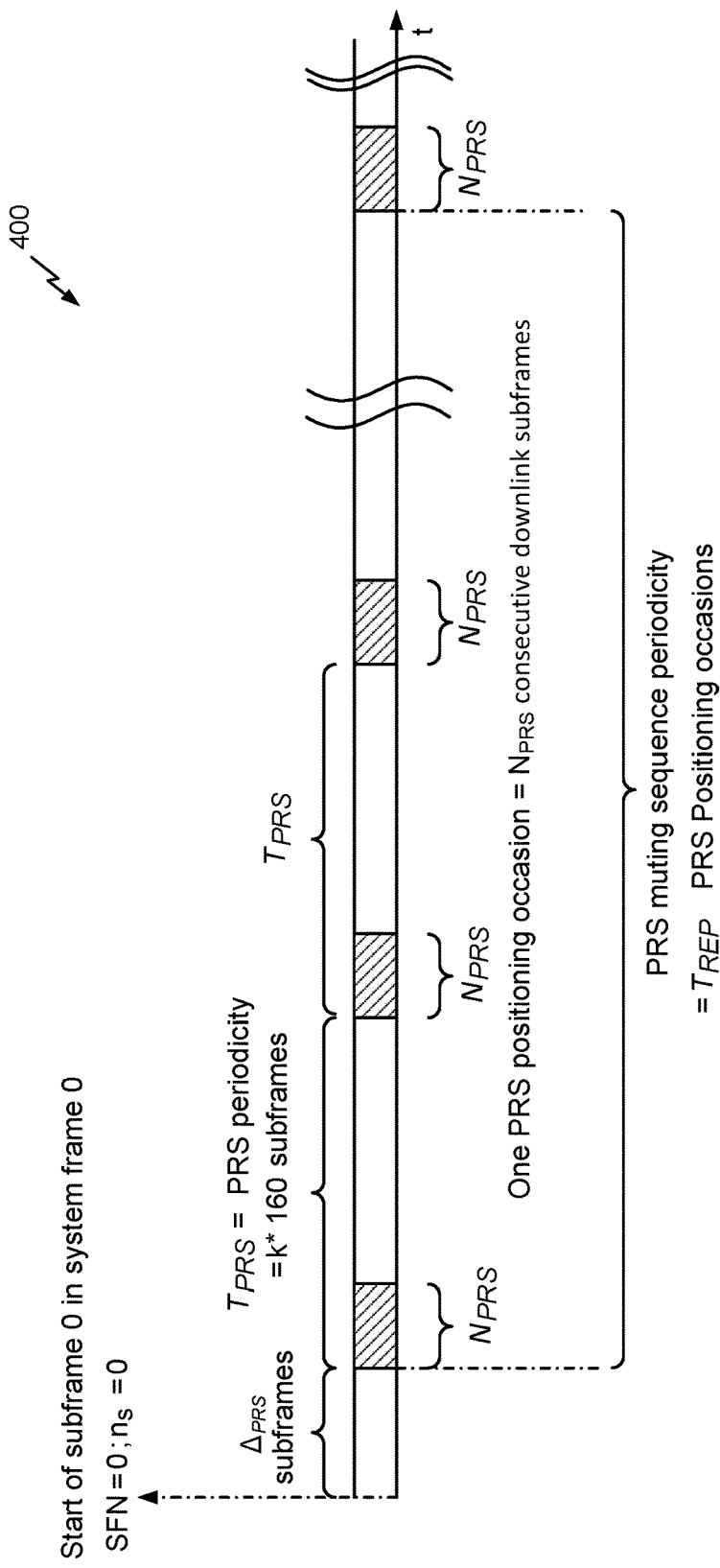
FIG. 4 is an example PRS duty cycle for OTDOA positioning.

As noted, in some embodiments, positioning functionality may be implemented, at least in part, using positioning signaling, such as PRS transmissions, sent by a positioning beacon (such as the positioning beacon 312 depicted in FIG. 3) that supports one-way communication (i.e., the positioning beacon does not receive uplink communication from wireless devices, such as the UE 100 depicted in FIGS. 1-3, that receive positioning signals from the beacon). Positioning reference signals are transmitted (e.g., by a node such as a base station or a dedicated positioning beacon) in special positioning sub-frames that are grouped into positioning occasions. FIG. 4 shows a time sequence 400 of an example PRS duty cycle for OTDOA positioning. FIG. 4 illustrates a sequence of LTE subframe transmissions from one cell transmitter (e.g. eNB 202, eNB 1-N 310-1-310-N, the positioning beacon 312-1, 312-2 or 312-M) starting with transmission at subframe zero in a system frame with system frame number (SFN) zero and extending to transmission from the last subframe of the system frame with SFN equal to 1023 (on the far right in FIG. 4 and not specifically shown in FIG. 4). In Frequency Division Duplex (FDD) mode of LTE, each LTE subframe has a duration of one millisecond (1 ms) and each system frame is composed of 10 subframes and has a duration of 10 ms. System frames can also be referred to as radio frames or simply as frames. Consecutive system frames are numbered from 0 to 1023, after which the numbering restarts again from zero for subsequent system frames. Therefore, FIG. 4 shows transmission over the longest set of subframes that can be individually and distinctly referenced (e.g. via subframe and system frame numbering) for LTE. In FIG. 4, increasing time is represented by the horizontal lines going from left to right. Groups of consecutive subframes that are used to transmit PRS, and that are referred to in 3GPP TSs (e.g., in 3GPP TS 36.211 and 36.355) as "PRS positioning occasions", are represented in FIG. 4 by the diagonally striped rectangles.

As defined by 3GPP (e.g., in TS 36.211), the sequence of subframes used to transmit PRS for OTDOA is characterized and defined by a number of parameters comprising: (i) a reserved block of bandwidth (BW); (ii) a configuration index $I_{PRS}$ (which defines both an offset $\Delta_{PRS}$ from the start of subframe zero for SFN zero to the first PRS positioning occasion and a periodicity $T_{PRS}$ in units of subframes for consecutive PRS positioning occasions); (iii) a duration $N_{PRS}$ (defining the number of consecutive PRS subframes in each PRS positioning occasion); (iv) an optional muting pattern (defining a sequence of consecutive PRS positioning occasions within which the PRS signal is either transmitted or is muted according to the muting pattern); and (v) a muting sequence periodicity $T_{REP}$ which can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15 or 20 MHz. To increase the PRS duty cycle, the $N_{PRS}$ value can be increased to six (i.e., $N_{PRS}=6$) and the bandwidth (BW) value can be increased to the LTE system bandwidth (i.e., BW=LTE system bandwidth). An expanded PRS with a larger $N_{PRS}$ (e.g., greater than six) and/or a shorter $T_{PRS}$ (e.g., less than 160 ms), up to the full duty cycle (i.e., $N_{PRS}=T_{PRS}$), may also be used by modifying the existing definition of OTDOA.

For the case of LTE using Time Division Duplex (TDD) mode, system frames are again each of duration 10 ms and each system frame comprises eight available subframes for uplink or downlink transmission. The PRS parameters described above for FDD are then used to define in which downlink subframes PRS transmission occurs. Specifically, the offset $\Delta_{PRS}$ provides the number of downlink subframes from the first downlink subframe in system frame zero to the first PRS subframe; the duration $N_{PRS}$ provides the number of consecutive downlink PRS subframes in each PRS positioning occasion; and the periodicity $T_{PRS}$ provides the number of downlink subframes between the start of consecutive PRS positioning occasions. Similar to FDD mode, an expanded PRS could be defined up to full duty cycle.

In the case of a positioning beacon 312, PRS subframes and PRS positioning occasions may be supported as described in association with FIG. 4 which may allow legacy UEs 100 to measure the PRS signals and obtain RSTD measurements as described in association with FIG. 3. In addition, other PRS signals may be transmitted by a positioning beacon 312 such as additional PRS subframes in a PRS positioning occasion, additional PRS positioning occasions and/or different PRS signals that may be acquired and measured by new enhanced UEs 100 but not by legacy UEs, which may improve positioning accuracy (e.g. by increasing RSTD measurement accuracy) for the new enhanced UEs 100. As an example of different PRS signals, the PRS code sequence as defined in 3GPP TS 36.211 could be changed (e.g. by using a different code sequence initial value which could be based on some identity for a positioning beacon), and/or the PRS signal could be transmitted using a different frequency or set of different frequencies (e.g. via frequency hopping) for each subframe in a positioning occasion or for each positioning equation. A positioning beacon may then transmit both PRS signals that are supported by (e.g. can be acquired and measured by) legacy UEs, such as signals defined in 3GPP TS 36.211 and described in association with FIG. 4, and new PRS signals that can only be acquired and measured by new enhanced UEs. This may improve positioning support for both legacy UEs and new enhanced UEs.

In addition to PRS signals (or other types of positioning signals) as shown in FIG. 4, subframes generally may include various control signals (e.g., provided within resource elements, or REs, of LTE subframes). For example, as described herein, control signaling may include signals to control the establishment of communication channels with mobile devices (e.g., control establishment of uplink communication between receiving UEs and a network node, such as an eNB node). In embodiments in which the network node transmitting the PRS signals is not capable of uplink communications, e.g., the network node is a one-way positioning beacon 312, the control signals may include signals to inhibit the receiving UEs from sending uplink communications to the network node (e.g., by omitting LTE information blocks such MIB, SIB1, or SIB2, including a closed subscriber group (CSG) indicator in the SIB1 information block, etc.) In some embodiments, additional PRS subframes may be added to transmissions sent, for example, by positioning beacons 312. Legacy UEs will generally be configured to process PRS signals according to previous, known, PRS patterns (e.g., PRS positioning occasion patterns, as well as the PRS REs patterns within such PRS subframes), while new UEs (e.g., with enhanced positioning functionality) may be configured to detect and process the additional PRS subframes and/or additional PRS REs within each such subframe. Furthermore, UEs with enhanced positioning functionality may be configured to recognize positioning beacons and avoid establishing uplink communication links with such positioning beacons without needing to be provided with inhibiting signaling such as those described herein in relation to legacy UEs.

Figure 5:
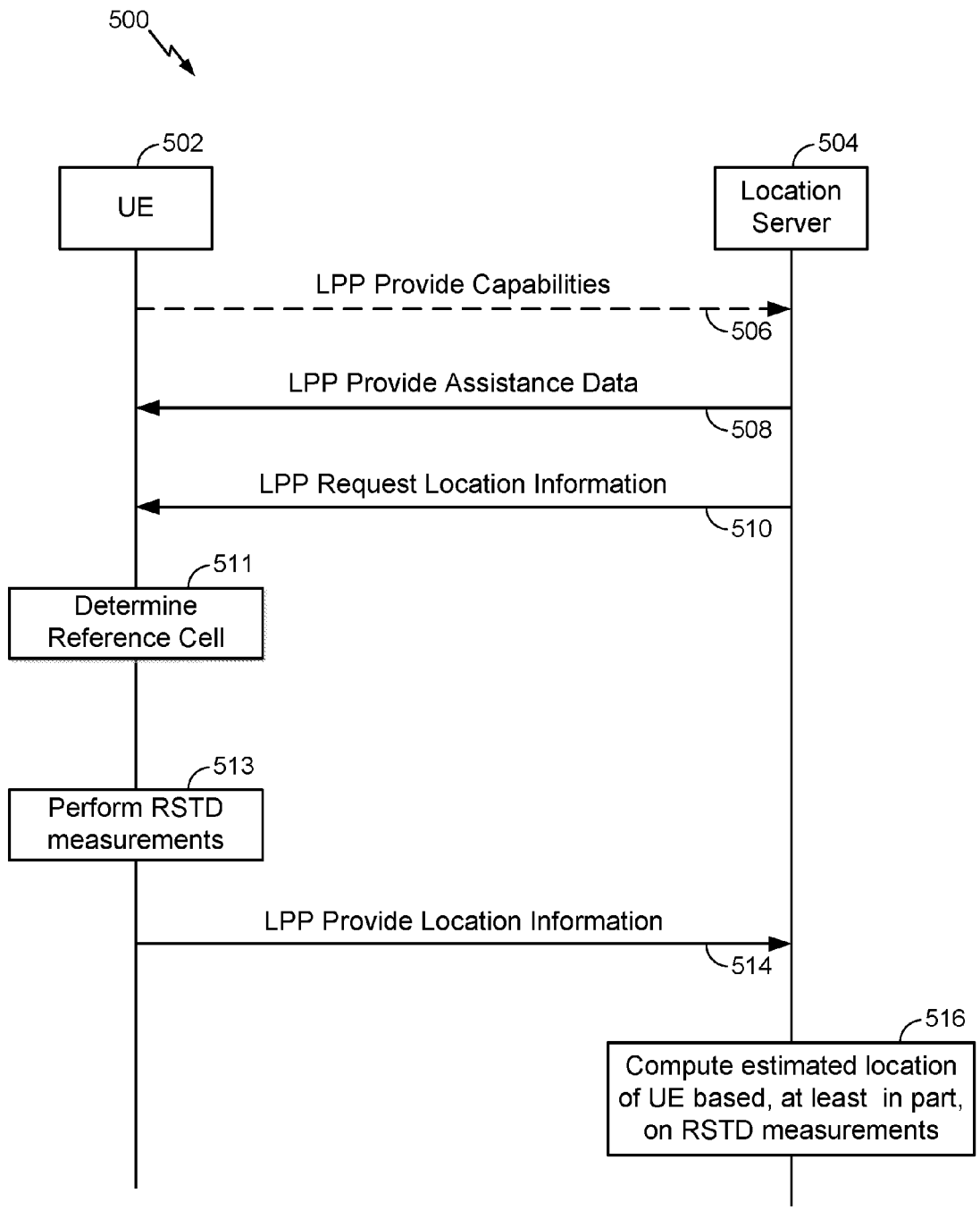
FIG. 5 is a message flow diagram of an example positioning procedure using OTDOA.

Performing positioning operations for a UE using positioning signals from network nodes that include one or more positioning beacons are described with reference to FIG. 5 (and with further reference to FIGS. 1-4) showing a message flow process 500 of an example procedure for supporting positioning using OTDOA with the LPP protocol. The entities in the message flow process 500 include a UE 502 and a location server 504. The UE 502 may correspond to the UE 100 in FIGS. 1-3 and the location server 504 may correspond to the E-SMLC 208 or SLP 232 in FIG. 2 and/or to the location server 302 in FIG. 3. Positioning of the UE 502 as illustrated in FIG. 5 may be supported via an exchange of LPP messages or LPP/LPPe messages between the UE 502 and the location server 504. The LPP messages may be exchanged between UE 502 and location server 504 via one or more intermediate networks such as the network 250 or the network 306 and/or via a base station or an AP such as any of the eNBs 310 depicted in FIG. 3 (e.g., the eNB nodes 310-1, 310-2, 310-N) in the wireless communication system 300, or the eNB 202 in the network 250. The LPP messages and the procedures that they support are described, for example, in 3GPP TS 36.355. The procedure shown in FIG. 5 may be used to position the UE 502 in order to support some location related service like navigation or direction finding support for the UE 502 (or for the user of the UE 502) or for routing or provision of an accurate location to a PSAP in association with an emergency call from the UE 502 to a PSAP (e.g. as described in association with FIG. 2), or for some other reason.

Initially and as an optional stage in process 500, the UE 502 may provide its positioning capabilities to the location server 504 relative to the LPP protocol by sending an LPP Provide Capabilities message at stage 506 to the location server 504 indicating the position methods and features of these position methods that are supported by UE 502 using LPP. In one implementation, the LPP Provide Capabilities message at stage 506 may be sent by the UE 502 in response to an LPP Request Capabilities message sent by the location server 504 to the UE 502 (not shown in FIG. 5). The capabilities indicated in the LPP Provide Capabilities message at stage 506 may, in some embodiments, indicate that the UE 502 supports OTDOA positioning and/or may indicate that the UE 502 supports receipt of assistance data. The location server 504 may then determine that it may derive the position for the UE 502 using OTDOA for LTE access— e.g. because the UE 502 capabilities sent at the stage 506 indicate support of OTDOA by the UE 502 and/or because the UE 502 may currently have LTE wireless access to a serving network containing the location server 504. In some embodiments, if the UE 502 is an enhanced UE, the positioning capabilities indicated at stage 506 may indicate support of additional PRS signals (as described previously) that may be supported by positioning beacons but may not be supported by legacy UEs.

The location server 504 may then send an LPP Provide Assistance Data message to the UE 502 at stage 508. In some implementations, the LPP Provide Assistance Data message at the stage 508 may be sent by the location server 504 to the UE 502 in response to an LPP Request Assistance Data message sent by the UE 502 to the location server 504 (not shown in FIG. 5). In some implementations, the LPP Provide Assistance Data message at the stage 508 may be sent after the message at stage 510. The LPP Provide Assistance Data message at the stage 508 may include positioning assistance data in the form of OTDOA assistance data to enable or help enable the UE 502 to obtain and return OTDOA RSTD measurements and may include information for a reference cell (e.g. a cell corresponding to one of the network nodes of FIG. 3, such as an eNB 310 or a positioning beacon 312) that may include a global ID for the reference cell, a physical cell ID for the reference cell, carrier frequency information, PRS signal information (e.g., bandwidth, frequency, number of subframes per PRS positioning occasion, starting point and periodicity of PRS positioning occasions, muting sequence). The LPP Provide Assistance Data message at stage 508 may also include OTDOA assistance data for neighbor cells (e.g. one or more of cells corresponding to eNBs 310 and/or positioning beacons 312 in FIG. 3). In an example, if the UE 502 indicates support for inter-frequency RSTD measurements, the neighbor cell assistance data may be provided for up to 3 frequency layers. The information provided for each neighbor cell in the LPP Provide Assistance Data message at the stage 508 may be similar to that provided for the reference cell (e.g. may include a cell ID, cell frequency and PRS signal information) and may further include a slot number and/or subframe offset between the neighbor cell and the reference cell, an expected approximate RSTD value and RSTD uncertainty, just to provide a few examples.

Optionally, in some embodiments, the location server 504 may include in the LPP Provide Assistance Data message at the stage 508, for example, identifiers of a plurality of cell transmitters (e.g. for the reference cell and/or each neighbor cell) and expected carrier (or center) frequencies at which respective cell transmitters are transmitting a PRS in a downlink signal. The location server 504 may further include as part of positioning assistance data in the LPP Provide Assistance Data message a frequency error characteristic for one more of the plurality of cell transmitters indicative of an error associated with one or more of the expected carrier frequencies. In one embodiment, one or more frequency error characteristics may be included in the message sent at the stage 508 by the location server 504 if the UE capabilities provided in the message sent at the stage 506 indicate that the UE 502 supports receipt of a frequency error characteristic. A frequency error characteristic may express an uncertainty or expected error in an expected carrier frequency of a PRS transmitted by a particular cell transmitter. The UE 502 may then determine a usage of coherent integration and/or non-coherent integration based, at least in part, on at least one of the frequency error characteristics to measure a characteristic (e.g. a TOA or RSTD) for a downlink PRS signal for at least one of the plurality of cell transmitters according to the OTDOA positioning method. In one implementation, a frequency error characteristic may comprise an indication of a suitability of an associated cell transmitter as a reference cell transceiver for OTDOA. In another implementation, a frequency error characteristic may comprise an indication of a class of the frequency error characteristic (e.g. an upper bound, lower bound or range of values for an error e) or a maximum or expected value for a frequency error characteristic. In one implementation, the frequency error characteristic may correspond to the fractional error in a carrier frequency for an associated cell transmitter (e.g. expressed in ppm). In one implementation, the frequency error characteristic may correspond to an indication that a cell transmitter corresponds to a positioning beacon, which may be used by the UE 502 if the UE 502 is positioning-enhanced— e.g. may cause the UE 502 to not use the cell transmitter indicated as corresponding to a positioning beacon as a reference cell (e.g. because the carrier frequency of a positioning beacon may typically be less precise than that for an eNB).

In some embodiments, if the UE 502 is enhanced and indicated a capability to support additional PRS signals at the stage 506, the assistance data sent at the stage 508 may include information on additional PRS signals (such as additional PRS subframes, additional PRS positioning occasions, different PRS code sequences and/or PRS frequency hopping, as described previously) that may be transmitted by one or more positioning beacons.

The location server 504 may then send an LPP Request Location Information message at stage 510 to the UE 502 to request OTDOA RSTD measurements for the reference cell and neighbor cells indicated at the stage 508. The LPP Request Location Information message at the stage 510 may include environmental characterization data to provide the UE 502 with information about expected multipath and/or non-line of sight (LOS) in the current area. The LPP Request Location Information message at the stage 510 may also include a desired accuracy (e.g., of a location estimate based on RSTD measurements provided by the UE 502) and a response time (e.g., the maximum time between receipt of the LPP Request Location Information message at the stage 510 by the UE 502, and the time of the transmission of an LPP Provide Location Information message sent at the stage 514 by the UE 502). An optional periodic reporting period may also be included in the message at the stage 510.

As pointed out above, positioning assistance data received at the stage 508 may indicate that a particular transmitter (e.g. an eNB 310 or positioning beacon 312 as in FIG. 3) is to be used as a reference cell for OTDOA RSTD measurements by the UE 502. Positioning assistance data received at the stage 508 may optically comprise, in some embodiments, expected carrier frequencies of downlink signals for cells and associated frequency error characteristics. In addition or instead, positioning assistance data received in the LPP Provide Assistance Data message at the stage 508 may provide a frequency error characteristic for any reference cell and/or for one or more neighbor cells. A frequency error characteristic provided in an LPP Provide Assistance Data message may indicate whether a particular cell may be used as a reference cell, may not be used as a reference cell or must not be used as a reference cell. The frequency error characteristic may also, or instead, provide an indication of an expected or maximum error in a carrier frequency for a reference cell or neighbor cell. The UE 502 may then make use of any reference cell indicated at the stage 508 to obtain OTDOA RSTD measurements without changing the reference cell—e.g. if the UE is able to receive strong signals from the reference cell and measure a PRS signal accurately without the need for long signal integration. In that case, the UE 502 may not need to perform stage 511 of the procedure 500. Alternatively, the UE 502 may determine a reference cell for ODTOA positioning at the stage 511—e.g. if no reference cell is provided by the server 504 in the positioning assistance data received at the stage 508, or if a reference cell is provided. Determination of a reference cell at stage 511 may optionally be based, in some embodiments, in part, on one or more frequency error characteristics provided by the location server 504 in the assistance data in the LPP Provide Assistance Data message sent at the stage 508. For example, if the frequency error characteristics provided by the location server 504 indicate which neighbor cells are and/or are not suitable for use as a reference cell, the UE 502 may determine a particular cell to be a reference cell that is indicated as being suitable as a reference cell (or is not indicated as being unsuitable as a reference cell). The UE 502 may further base the determination of a reference cell on the signal level and/or signal quality (e.g. S/N) of each cell that is indicated as being suitable as a reference cell (or is not indicated as being unsuitable as a reference cell). In some cases, the UE 502 may determine to use the same reference cell that was indicated by the server 504 in the LPP Provide Assistance Data message at the stage 508 (e.g. because other cells indicated as being suitable or not unsuitable as reference cells have lower signal strength and/or lower S/N). In other cases, the UE 502 may determine to use a different reference cell than was indicated by the server 504 at the stage 508 (e.g. because the determined different cell was indicated as being suitable or was not indicated as being unsuitable as a reference cell in the message at stage 508 and/or has higher signal strength and/or higher S/N than the reference cell indicated at stage 508).

At stage 513, the UE 502 utilizes the OTDOA positioning assistance information received at the stage 508 and any additional data (e.g. a desired accuracy of a location estimate) received at the stage 510 to perform RSTD measurements for the OTDOA position method. The RSTD measurements may be made between the reference cell (e.g., the reference cell determined at the stage 511 or the reference cell indicated at the stage 508) and one or more of the neighbor cells indicated at the stage 508. As described in association with FIG. 3, the reference cell may be a cell supported by an eNB (e.g. an eNB 310) or may be a cell associated with a positioning beacon (e.g. a positioning beacon 312). Similarly, each neighbor cell may be a cell supported by an eNB (e.g. an eNB 310) or may be a cell associated with a positioning beacon (e.g. a positioning beacon 312). In some implementations, the RSTD may be measured by first measuring a time of arrival (TOA) for a PRS of the reference cell (e.g., corresponding to a reference positioning beacon when such a positioning beacon is deployed and selected to provide a reference cell) and a TOA for a PRS of the neighbor cell, and then determining the RSTD measurement from the difference in the two TOA measurements. In obtaining each RSTD measurement, a legacy UE 502 may measure PRS as defined in 3GPP TS 36.211, whereas an enhanced UE 502 may measure both PRS signals supported by a legacy UE and any additional PRS signals which may be supported by positioning beacons if the assistance data sent at stage 510 included information for the additional PRS signals.

As noted, in some embodiments, one or more PRS transmissions may be received and/or may be measured from a positioning beacon (e.g. corresponding to the determined/specified reference cell or to a neighbor cell). A legacy UE 502, however, might attempt to establish uplink communication channels (e.g. to support cell change or handover) with the positioning beacon corresponding to the cell from which the PRS transmissions are received and/or measured. However, positioning beacons, such as the positioning beacons 312 depicted in FIG. 3, are not configured to establish uplink communication links with UEs. Therefore, to prevent, bar, or inhibit a UE 502 that receives or measures PRS transmissions from a positioning beacon to attempt to establish an uplink communication with that positioning beacon, the positioning beacon may be configured to transmit, either with PRS transmissions, or in a different transmission(s) separate from the PRS transmissions, one or more downlink signals that inhibit the UE from sending uplink signals to the positioning beacon.

In some embodiments, the downlink signal to inhibit the UE 502 from sending the uplink signals to the positioning beacon may include various subframe information blocks that can be sent periodically within control resource elements in an LTE subframe. For example, inhibiting a receiving UE 502 from trying to send uplink transmissions to the positioning beacon may be achieved by omitting various information blocks that are generally included within LTE control signaling sent in subframes. These may include: a) omitting a master information block (MIB) for the corresponding LTE cell, which may be transmitted in a Physical Broadcast Channel (PBCH) and carries physical layer information, b) omitting a system information block one (SIB1) for the corresponding LTE cell, which may be transmitted via a Physical Downlink Shared Channel (PDSCH) and carries information such as whether or not a UE is allowed access to an LTE cell, and/or c) omitting a system information block two (SIB2) for the corresponding LTE cell, which may also be transmitted via the PDSCH and carries information such as shared channel information as well as information to facilitate uplink communication (e.g., uplink power control). Thus, in such embodiments, the UE 502 receives downlink control transmissions sent by the positioning beacon, and determines whether one or more LTE information blocks are omitted. For example, in response to a determination that one or more of an MIB block, an SIB1 block, and/or an SIB2 block for the corresponding LTE cell are omitted from the downlink control signaling, the UE 502 (e.g., a legacy UE) may be configured to avoid transmitting uplink transmissions to the positioning beacon (e.g., to avoid cell selection and network access using such cells).

In some embodiments, inhibiting the UE 502 from trying to send uplink transmissions to the positioning beacon may be achieved by including in, for example, a system information block one (SIB1), a closed subscriber group (CSG) indicator and a CSG identifier to which the UE 502 does not belong. Thus, in such situations, because the receiving UE 502 is not a member of the subscriber group identified by the CSG indicator transmitted in the control downlink transmission(s) from the positioning beacon, the UE 502 will not attempt to establish an uplink communication channel with (or otherwise transmit uplink communications to) the positioning beacon transmitting the control downlink transmissions. In some embodiments, inhibiting the UE 502 from trying to send uplink transmissions to the positioning beacon may be achieved by including in a system information block two (SIB2) an access-barring indicator (e.g. an access barring indicator for emergency calls and/or an access barring indicating for other services). Under those circumstances, the receiving UE 502, in response to detecting such an access-barring indicator (e.g., matching the received value in the SIB2 information block to a pre-determined code indicative that accessing the transmitting LTE network node is barred), will be inhibited from establishing an uplink communication link with the transmitting positioning beacon. Other ways, including other types of information to include in one or more signals from the positioning beacon (e.g., control signals included within, for example, various LTE information blocks), or from other nodes (e.g., from the location server) may also be used to inhibit the receiving UE 502 from sending uplink communications to the positioning beacon.

It should be noted that, in some situations, it may also be necessary to include within control signals sent by the positioning beacon, or by some other network nodes, control information (e.g., indicator or identifier to populate various information blocks) to inhibit the receiving UE 502's functionality to make an emergency call. For example, in some embodiments, inhibiting/preventing/barring the UE 502 from transmitting uplink signals to a one-way positioning beacon transmitting downlink signals by identifying within the SIB1 block a closed subscriber group (CSG) indicator to which the UE does not belong might still result in the UE attempting to, in case of an emergency call, to send uplink transmissions to the positioning beacon (which cannot process or respond to such uplink signals). Thus, in this situation, an emergency call barring indicator (barring the UE from trying to send an emergency communication to at least the positioning beacon) may be included (e.g. in the SIB2) with, for example, downlink control signals from the positioning beacon.

Turning back to FIG. 5, having performed RSTD measurements (e.g., using PRS transmissions from positioning beacons, such as one or more of the positioning beacons 312 of FIG. 3, and/or PRS transmissions from neighboring nodes, such as one or more of the eNBs 310), the UE 502 may send an LPP Provide Location Information message at stage 514 to the location server 504 conveying RSTD measurements that were obtained at the stage 513 and before or when any maximum response time has expired (e.g., a maximum response time provided by the location server 504 at, for example, the stage 510). The LPP Provide Location Information message at the stage 514 may include the time (or times) at which the RSTD measurements were obtained and an identity of the reference cell for the RSTD measurements (e.g., the reference cell physical cell ID and carrier frequency). The message at the stage 514 may also include a neighbor cell measurement list including, for each measured neighbor cell, the identity of the cell (e.g. physical cell ID, global cell ID and/or cell carrier frequency), the RSTD measurement for the cell and the quality of the RSTD measurement for the cell (e.g. the expected error in the RSTD measurement). The neighbor cell measurement list may include RSTD data for one or more cells. One or more of the identified reference and/or neighbor cells may correspond to positioning beacons making use of a cell (e.g. a simulated cell) associated with each positioning beacon as described earlier.

Stage 516 may comprise a computation by location server 504 of an estimated location of UE 502 using ODTOA positioning techniques based, at least in part, on measurements received in the LPP Provide Location Information message at the stage 514 (e.g., RSTD measurements). As an example, the location server 504 can use the techniques described herein in association with FIG. 3 and equations (1) to (4) to compute a location estimate. In an alternative embodiment, the location computation stage 516 may be performed by the UE 502 following the stage 513—e.g. if positioning assistance data transferred in the message at the stage 508 includes BSA for the reference and neighbor cells (e.g. cell antenna location coordinates and timing or time synchronization information). In this embodiment, the UE 502 may return any computed location estimate to the location server 504 in the message at the stage 514 and the stage 516 may not need to be performed.

While FIG. 5 shows example support for OTDOA positioning using the LPP positioning protocol, other examples exist where the positioning protocol and/or the position method may be different. For example, in alternative embodiments, the positioning protocol may be LPPe, LPP/LPPe, the RRC protocol defined in 3GPP TS 36.331 or the IS-801 protocol defined in 3GPP2 TS C.S0022. Similarly, the position method may be OTDOA for UMTS access, Enhanced Observed Time Difference (E-OTD) for GSM or Advanced Forward Link Trilateration (AFLT). In addition, the downlink signal that is measured may not be a PRS signal but some other downlink reference signal or pilot signal (e.g., a common reference signal (CRS) for LTE) and the measurements of the downlink signal may not be of RSTD but instead (or in addition) of some other quantity such as time of arrival (TOA), angle of arrival (AOA), RSSI, RTT, S/N etc. Although the positioning protocol, the position method and/or the measured quantities may differ, the provisioning of downlink signals, by a network node configured for one-way transmission of positioning signals without receiving uplink communications, to inhibit a UE (e.g. a legacy UE) from sending uplink communications to such a node may be the same as or similar to that described for the message flow process 500. Thus in the case of positioning beacons, the same techniques as described previously may be used to enable improvement of positioning for other downlink positioning methods and using other positioning measurements.

Figure 6:
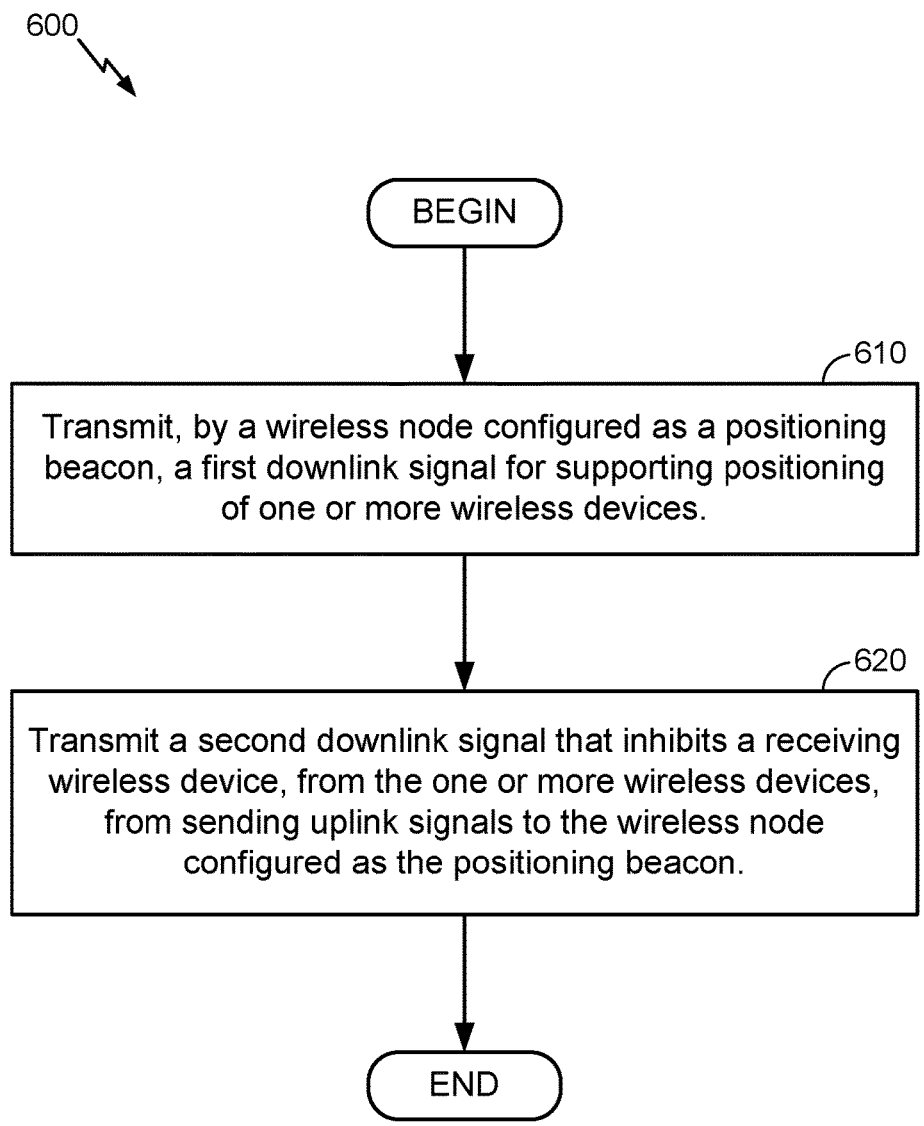
FIG. 6 is a flowchart of an example procedure, generally performed at a network node configured for one-way downlink broadcast/multicast transmissions, to facilitate position determination operations.

With reference now to FIG. 6, a flowchart of an example procedure 600, generally performed at a network node configured for one-way downlink broadcast/multicast transmissions (e.g., a positioning beacon such as the positioning beacon 201 in FIG. 2 or any positioning beacon 312 depicted in FIG. 3), to facilitate position determination operations, is shown. The procedure 600 includes transmitting 610, by the wireless node configured as a positioning beacon, a first downlink signal for supporting positioning of one or more wireless devices. The procedure 600 further includes transmitting 620 a second downlink signal that inhibits a receiving wireless device, such as a legacy UE and which may correspond to the UE 100 in FIGS. 1-3 or the UE 502 in FIG. 5, from the one or more wireless devices, from sending uplink signals to the wireless node configured as the positioning beacon. As noted, in some embodiments, the first downlink signal and the second downlink signal may be configured according to 3GPP Long Term Evolution (LTE) standards. The first downlink signal may include positioning reference signals detectable by the one or more wireless devices to facilitate location determination based on observed time difference of arrival (OTDOA). The first and second downlink signal transmissions may be transmitted in any order.

In some embodiments, transmitting the second downlink signal may include generating the second downlink signal with one or more LTE information blocks omitted. The one or more LTE information blocks omitted may include, for example, a master information block (MIB) for a corresponding LTE cell, a system information block one (SIB1) for the corresponding LTE cell, and/or a system information block two (SIB2) for the corresponding LTE cell. The generated second down link signal, with the one or more LTE information blocks omitted, is then transmitted (and received by the UE that is to perform measurements, such as RSTD measurements, based on which location determination, using such techniques as OTDOA, is performed). In some embodiments, the second downlink signal may include a system information block one (SIB1), with the SIB1 including a closed subscriber group (CSG) indicator and a CSG identifier to which none of the one or more wireless devices belong. In some embodiments, the second downlink signal may include a system information block two (SIB2), with the SIB2 including an access-barring indicator.

Figure 7:
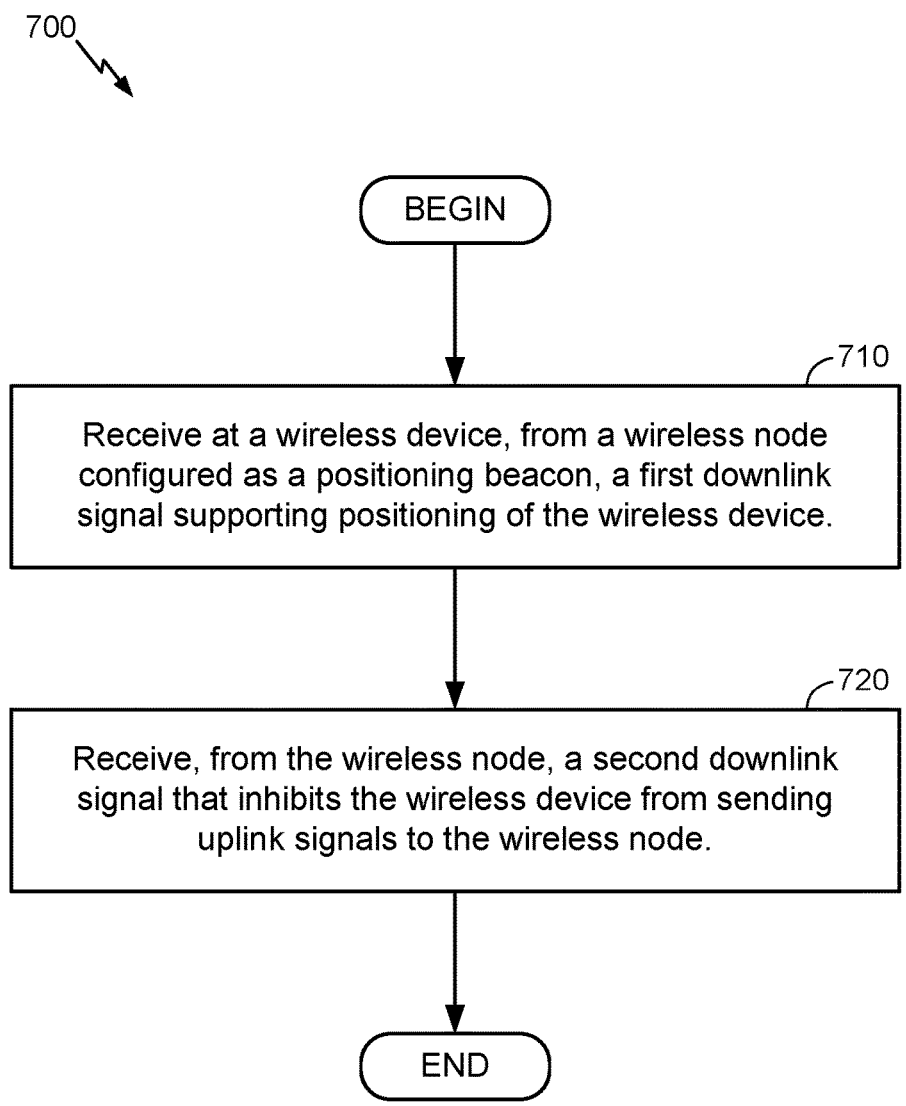
FIG. 7 is a flowchart of an example procedure, generally performed at a mobile wireless device (e.g., a UE), to facilitate position determination operations.

With reference now to FIG. 7, a flowchart of an example procedure 700, generally performed at a wireless device (e.g., a UE such as the UE 100 in FIGS. 1-3 or the UE 502 in FIG. 5), to facilitate position determination operations, is shown. The procedure 700 includes receiving 710 at a wireless device, from a wireless node configured as a positioning beacon (e.g. the positioning beacon 201 in FIG. 2 or a positioning beacon 312 in FIG. 3), a first downlink signal supporting positioning of the wireless device. The received first downlink signal may include receiving one or more transmissions, such as periodical positioning signals (e.g., periodical PRS transmissions). The procedure 700 further includes receiving 720, from the wireless node, a second downlink signal that inhibits the wireless device from sending uplink signals to the wireless node. Here too, the second downlink signal may include multiple signal transmission (e.g., multiple periodical LTE control signals).

In some embodiments, the procedure 700 may further include determining location information for the wireless device based, at least in part, on the first downlink signal from the wireless node. In some embodiments, the wireless device receiving the positioning signals (e.g., LTE PRS signals) may process (e.g. may acquire and measure) the positioning signals to determine location information (e.g. RSTD measurements for OTDOA) without attempting to establish an uplink communication channel with the node that transmitted the first downlink positioning signals (e.g., because the network wireless node may be a positioning beacon incapable of establishing uplink communication channels). Thus, for example, determining the location information may include determining the location information based, at least in part, on the first downlink signal, and refraining from establishing, in response to detecting uplink-inhibiting signaling information in the second downlink signal, an uplink communication channel with the wireless node. The receiving wireless device may refrain from establishing an uplink communication link, due to receiving the second downlink signal, whether or not it measured the first downlink signal.

As noted, in some embodiments, the first downlink signal and the second downlink signal may be configured according to 3GPP Long Term Evolution (LTE) standards. In such embodiments, receiving the second downlink signal may include determining whether one or more LTE information blocks are omitted, with the one or more LTE information blocks omitted including, for example, a master information block (MIB) for a corresponding LTE cell, a system information block one (SIB1) for the corresponding LTE cell, and/or a system information block two (SIB2) for the corresponding LTE cell. In such embodiments, the second downlink signal may include a system information block one (SIB1) that includes a closed subscriber group (CSG) indicator and a CSG identifier to which the wireless device does not belong, and/or a system information block two (SIB2) that includes an access-barring indicator.

Figure 8:
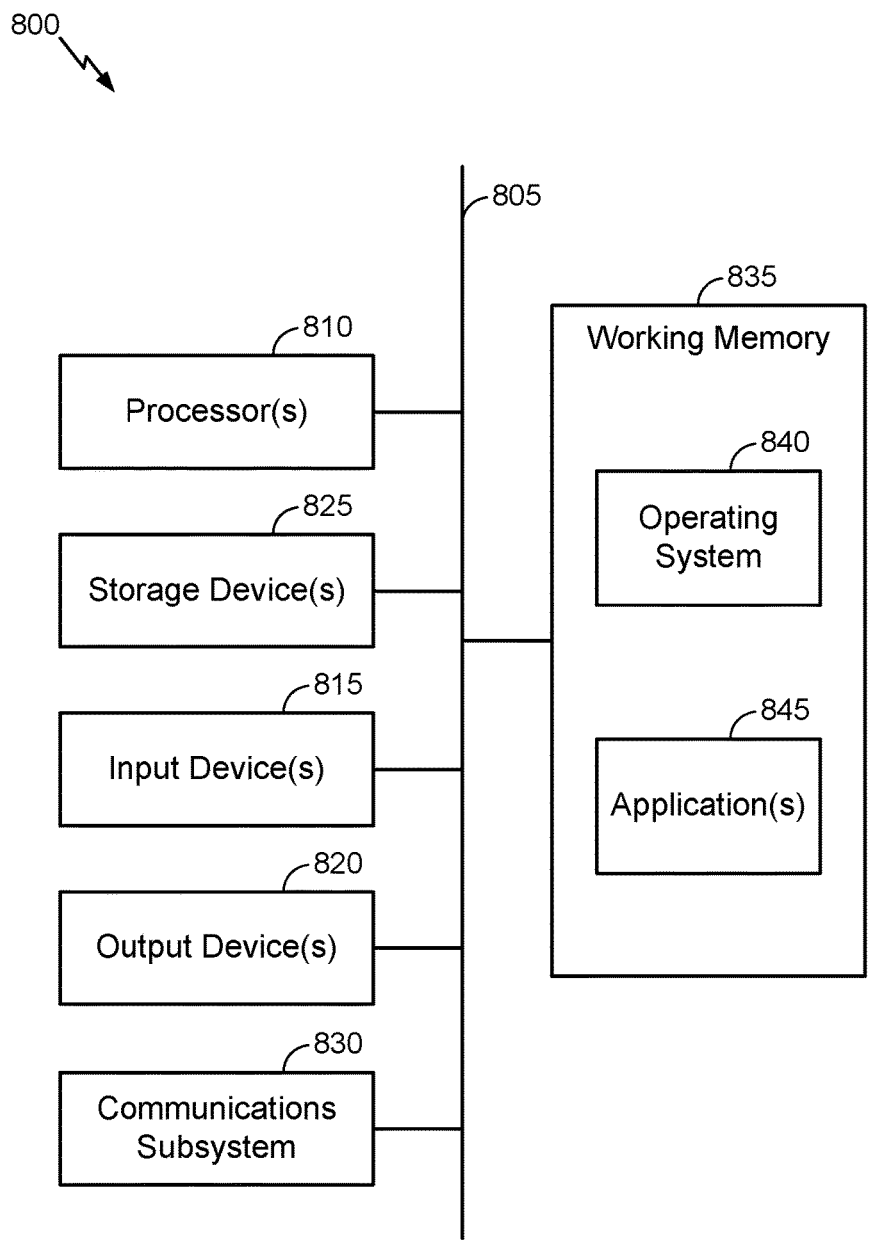
FIG. 8 is a block diagram of components of an example computer system for use in positioning operations.

Referring to FIG. 8, with further reference to FIGS. 1-7, a computer system 800 may be utilized in performing at least some of the procedures and methods described herein, and/or to at least partially implement the functionality of some of the elements in FIGS. 1, 2, 3, 4, 5, 6, and 7. FIG. 8 provides a schematic illustration of one embodiment of a computer system 800 that can perform, at least partly, the methods provided by various embodiments, as described herein, and/or can function as a mobile device, a wireless node, or another computer system. For example, the E-SMLC 208, SLP 232, the location server 302, the almanac 304, any of the positioning beacons 312-1 to 312-M, and/or the eNBs 310-1 to 310-N and/or the location server 504 may be comprised of one or more of the computer systems 800. FIG. 8 provides a generalized illustration of various components, any or all of which may be utilized as appropriate. FIG. 8 therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard and/or the like; and one or more output devices 820, which can include without limitation a display device, a printer and/or the like. The processor(s) 810 can include, for example, intelligent hardware devices, e.g., a central processing unit (CPU) such as those made by Intel® Corporation or AMD®, a microcontroller, an ASIC, etc. Other processor types could also be utilized.

The computer system 800 may further include (and/or be in communication with) one or more non-transitory storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 800 may also include a communications subsystem 830, which can include without limitation a modem, a network card (wireless or wired), an infrared communication device, a wireless communication device and/or chipset (such as a Bluetooth® short-range wireless communication technology transceiver/device, an 802.11 device, a WiFi device, a WiMax device, cellular communication facilities, etc.), and/or the like. The communications subsystem 830 may permit data to be exchanged with a network (such as the networks described herein), other computer systems, and/or any other devices described herein. In many embodiments, the computer system 800 will further comprise, as here, a working memory 835, which can include a RAM or ROM device, as described above.

The computer system 800 can also comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more processes described herein might be implemented as code and/or instructions executable by a computer (and/or a processor within a computer). Such code and/or instructions can be used to configure and/or adapt a general purpose computer (or other device) to perform one or more operations in accordance with the described methods.

A set of these instructions and/or code might be stored on a computer-readable storage medium, such as the storage device(s) 825 described above. In some cases, the storage medium might be incorporated within a computer system, such as the computer system 800. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

The computer system 800 may be used to perform methods in accordance with the disclosure. Some or all of the procedures of such methods may be performed by the computer system 800 in response to processor(s) 810 executing one or more sequences of one or more instructions (which might be incorporated into the operating system 840 and/or other code, such as an application programs 845) contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein. The terms "machine-readable medium" and "computer-readable medium," as used herein, refer to any medium that participates in providing data that causes a machine to operate in a specific fashion. In an embodiment implemented using the UE 100 and/or the computer system 800, various computer-readable media might be involved in providing instructions/code to processor(s) 111, 810 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 140, 825. Volatile media include, without limitation, dynamic memory, such as the working memory 140, 835. Transmission media include, without limitation, coaxial cables, copper wire and fiber optics, including the wires that comprise the bus 101, 805, as well as the various components of the communications subsystem 830 (and/or the media by which the communications subsystem 830 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, a Blu-Ray disc, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 111, 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the UE 100 and/or computer system 800. These signals, which might be in the form of electromagnetic signals, acoustic signals, optical signals and/or the like, are all examples of carrier waves on which instructions can be encoded, in accordance with various embodiments of the invention.

Figure 9:
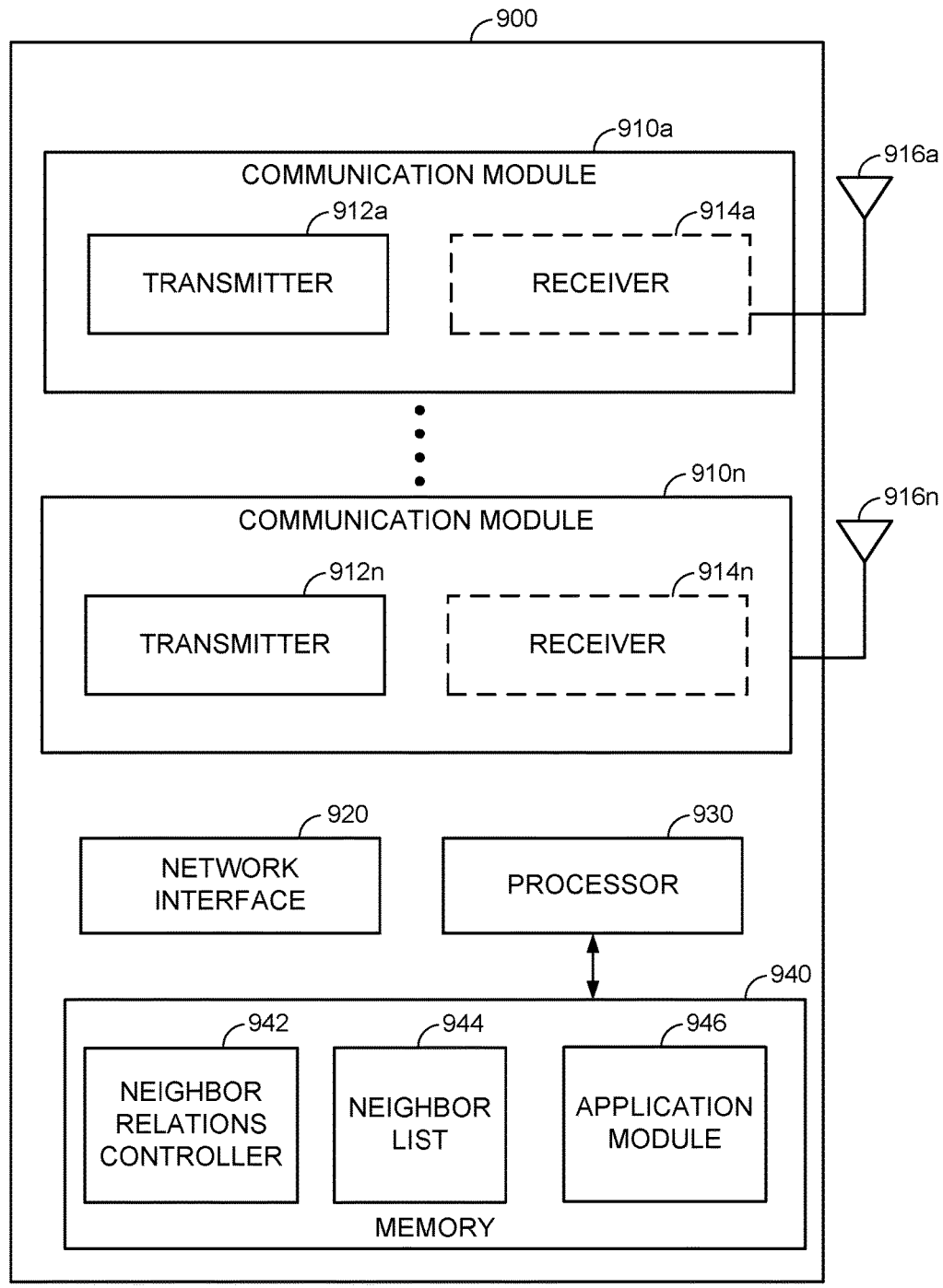
FIG. 9 is a schematic diagram of an example node (e.g., a base station, access point, positioning beacon, etc.).

With reference now to FIG. 9, a schematic diagram of an example wireless node 900, such as access point (e.g., a base station), which may be similar to, and be configured to have a functionality similar to that, of any of the various nodes depicted, for example, in FIGS. 1, 2, 3, 5, and 8 (e.g., the positioning beacons 312, the location servers, the eNB's, etc.) is shown. The wireless node 900 may include one or more communication modules 910*a-n* electrically coupled to one more antennas 916*a-n* for communicating with wireless devices, such as, for example, the UE 100 of FIGS. 1-3 and/or the UE 502 of FIG. 5. The each of the communication modules 910*a*-910*n* may include a respective transmitter 912*a-n* for sending signals (e.g., downlink messages) and, optionally (e.g., for nodes configured to receive and process uplink communications, such as the node eNB 202 of FIG. 2 or the eNB nodes 310-1 to 310-N of FIG. 3) a respective receiver 914*a-n* (such receivers may not be required for operation of positioning beacons, such as the positioning beacon 201 of FIG. 2 or the positioning beacons 312-1 to 312-M). In embodiments in which the implemented node includes both a transmitter and a receiver, the communication module comprising the transmitter and receiver may be referred to as a transceiver. The node 900 may also include a network interface 920 to communicate with other network nodes (e.g., sending and receiving queries and responses). For example, each network element may be configured to communicate (e.g., wired or wireless backhaul communication) with a gateway, or other suitable device of a network, to facilitate communication with one or more core network nodes (e.g., any of the other nodes and elements shown in FIGS. 2 and 3). Additionally and/or alternatively, communication with other network nodes may also be performed using the communication modules 910*a-n* and/or the respective antennas 916*a-n*.

The node 900 may also include other components that may be used with embodiments described herein. For example, the node 900 may include, in some embodiments, a processor (also referred to as a controller) 930 (which may be similar to the processors 111 and 810 of FIGS. 1 and 8, respectively) to manage communications with other nodes (e.g., sending and receiving messages) and to provide other related functionality, including functionality to implement the various processes and methods described herein. The processor 930 may be coupled to (or otherwise communicate with) a memory 940, which may include one or more modules (implemented in hardware of software) to facilitate controlling the operation of the node 900. For example, the memory 940 may include an application module 946 with computer code for various applications required to perform the operation of the node 900. For example, the processor 930 may be configured (e.g., using code provided via the application module 946, or some other module in the memory 940) to control the operation of the antennas 916*a-n* so as to adjustably control the antennas' transmission power and phase, gain pattern, antenna direction (e.g., the direction at which a resultant radiation beam from the antennas 916*a-n* propagates), antenna diversity, and other adjustable antenna parameters for the antennas 916*a-n* of the node 900. In some embodiments, the antennas' configuration may be controlled according to pre-stored configuration data provided at the time of manufacture or deployment of the node 900, or according to data obtain from a remote device (such as a central server sending data representative of the antenna configuration, and other operational parameters, that are to be used for the node 900). In some embodiments, the node 900 may be configured (e.g., through operation of the processor 930 and the memory 940) as a positioning beacon and may broadcast wireless transmissions that include downlink signals such as downlink positioning signals (e.g., PRS transmissions) and downlink control signals (e.g., to inhibit receiving UE's from sending uplink signals to the wireless node 900). The wireless node 900 may also be configured, in some implementations, to perform location data services, or performs other types of services, for multiple wireless devices (clients) communicating with the wireless node 900 (or communicating with a server coupled to the wireless node 900), and to provide location data and/or assistance data to such multiple wireless devices.

In addition, in some embodiments, the memory 940 may also include neighbor relations controllers (e.g., neighbor discovery modules) 942 to manage neighbor relations (e.g., maintaining a neighbor list 944) and to provide other related functionality. In some embodiments, the node may also include one or more sensors (not shown) and other devices (e.g., cameras), such as one or more of the sensors 135 and/or the camera 130 of the UE 100 depicted in FIG. 1.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device or station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device" or "wireless device") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station." A mobile device may also be referred to as a mobile terminal, a terminal, a user equipment (UE), a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

FURTHER SUBJECT MATTER/EMBODIMENTS OF INTEREST

The following recitation is drawn to additional subject matter that may be of interest and which is also described in detail herein along with subject matter presented in the initial claims presently presented herein:

A1—A method comprising: receiving at a wireless device, from a wireless node configured as a positioning beacon, a first downlink signal supporting positioning of the wireless device; and receiving, from the wireless node, a second downlink signal that inhibits the wireless device from sending uplink signals to the wireless node.

A2—The method recited in subject matter example A1, further comprising: determining location information for the wireless device based, at least in part, on the first downlink signal from the wireless node.

A3—The method recited in subject matter example A2, wherein determining the location information for the wireless device comprises: determining the location information based, at least in part, on the first downlink signal, without establishing, in response to detecting uplink-inhibiting signaling information in the second downlink signal, an uplink communication channel with the wireless node.

A4—The method recited in subject matter example A1, wherein the first downlink signal and the second downlink signal are configured according to 3GPP Long Term Evolution (LTE) standards.

A5—The method recited in subject matter example A4, wherein receiving the first downlink signal comprises: receiving one or more positioning reference signals detectable by the wireless device to facilitate location determination based on observed time difference of arrival (OTDOA).

A6—The method recited in subject matter example A5, further comprising: receiving a message identifying the wireless node as a reference cell or a neighbor cell to support OTDOA computations using the positioning reference signals transmitted by the wireless node and additional positioning reference signals transmitted by at least one other wireless node.

A7—The method recited in subject matter example A4, wherein receiving the second downlink signal comprises: determining whether one or more LTE information blocks are omitted, wherein the one or more LTE information blocks omitted include: a master information block (MIB) for a corresponding LTE cell, a system information block one (SIB1) for the corresponding LTE cell, or a system information block two (SIB2) for the corresponding LTE cell, or any combination thereof.

A8—The method recited in subject matter example A4, wherein the second downlink signal comprises: a system information block one (SIB1), wherein the SIB1 includes a closed subscriber group (CSG) indicator and a CSG identifier to which the wireless device does not belong.

A9—The method recited in subject matter example A4, wherein the second downlink signal comprises: a system information block two (SIB2), wherein the SIB2 includes an access-barring indicator.

A10—The method recited in subject matter example A9, wherein the SIB2 including the access-barring indicator comprises an indicator to: bar sending an emergency communication by the wireless device, or bar accessing by the wireless device another non-emergency service, or any combination thereof.

B—A mobile wireless device comprising: one or more processors; and a transceiver, coupled to the one or more processors, configured to: receive at the mobile wireless device, from a wireless node configured as a positioning beacon, a first downlink signal supporting positioning of the mobile wireless device; and receiving, from the mobile wireless node, a second downlink signal that inhibits the mobile wireless device from sending uplink signals to the wireless node.

C—An apparatus comprising: means for receiving at a wireless device, from a wireless node configured as a positioning beacon, a first downlink signal supporting positioning of the wireless device; and means for receiving, from the wireless node, a second downlink signal that inhibits the wireless device from sending uplink signals to the wireless node.

D—A non-transitory computer readable media programmed with instructions, executable on a processor, to: receive at a wireless device, from a wireless node configured as a positioning beacon, a first downlink signal supporting positioning of the wireless device; and receive, from the wireless node, a second downlink signal that inhibits the wireless device from sending uplink signals to the wireless node.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method at a wireless node for supporting positioning of one or more wireless devices comprising:
   transmitting, by the wireless node configured as a positioning beacon, a first downlink signal for supporting positioning of the one or more wireless devices; and
   transmitting a second downlink signal that inhibits a receiving wireless device, from the one or more wireless devices, from sending uplink signals to the wireless node configured as the positioning beacon.

2. The method of claim 1, wherein the first downlink signal and the second downlink signal are configured according to 3GPP Long Term Evolution (LTE) standards.

3. The method of claim 2, wherein the first downlink signal comprises positioning reference signals detectable by the one or more wireless devices to facilitate location determination based on observed time difference of arrival (OTDOA).

4. The method of claim 3, wherein the wireless node is identified as a reference cell or a neighbor cell to support OTDOA computations using the positioning reference signals transmitted by the wireless node and additional positioning reference signals transmitted by at least one other wireless node.

5. The method of claim 2, wherein transmitting the second downlink signal comprises:
   generating the second downlink signal with one or more LTE information blocks omitted, wherein the one or more LTE information blocks omitted include: a master information block (MIB) for a corresponding LTE cell, a system information block one (SIB1) for the corresponding LTE cell, or a system information block two (SIB2) for the corresponding LTE cell, or any combination thereof; and
   transmitting the second downlink signal with the one or more LTE information blocks omitted.

6. The method of claim 2, wherein the second downlink signal comprises:
   a system information block one (SIB1), wherein the SIB1 includes a closed subscriber group (CSG) indicator and a CSG identifier to which none of the one or more wireless devices belong.

7. The method of claim 2, wherein the second downlink signal comprises:
   a system information block two (SIB2), wherein the SIB2 includes an access-barring indicator.

8. The method of claim 7, wherein the SIB2 including the access-barring indicator comprises an indicator to: bar sending an emergency communication by the receiving wireless device, or bar accessing by the receiving wireless device another non-emergency service, or any combination thereof.

9. A wireless node to support positioning of one or more wireless devices, the wireless node comprising:
   one or more processors; and
   a transceiver, coupled to the one or more processors, configured to:
      transmit, by the wireless node configured as a positioning beacon, a first downlink signal for supporting positioning of the one or more wireless devices; and
      transmit a second downlink signal that inhibits a receiving wireless device, from the one or more wireless devices, from sending uplink signals to the wireless node configured as the positioning beacon.

10. The wireless node of claim 9, wherein the first downlink signal and the second downlink signal are configured according to 3GPP Long Term Evolution (LTE) standards.

11. The wireless node of claim 10, wherein the first downlink signal comprises positioning reference signals detectable by the one or more wireless devices to facilitate location determination based on observed time difference of arrival (OTDOA).

12. The wireless node of claim 11, wherein the wireless node is identified as a reference cell or a neighbor cell to support OTDOA computations using the positioning reference signals transmitted by the wireless node and additional positioning reference signals transmitted by at least one other wireless node.

13. The wireless node of claim 10, wherein the transceiver configured to transmit the second downlink signal is configured to:
   generate the second downlink signal with one or more LTE information blocks omitted, wherein the one or more LTE information blocks omitted include: a master information block (MIB) for a corresponding LTE cell, a system information block one (SIB1) for the corresponding LTE cell, or a system information block two (SIB2) for the corresponding LTE cell, or any combination thereof; and
   transmit the second downlink signal with the one or more LTE information blocks omitted.

14. The wireless node of claim 10, wherein the second downlink signal comprises:
   a system information block one (SIB1), wherein the SIB1 includes a closed subscriber group (CSG) indicator and a CSG identifier to which none of the one or more wireless devices belong.

15. The wireless node of claim 10, wherein the second downlink signal comprises:
   a system information block two (SIB2), wherein the SIB2 includes an access-barring indicator.

16. The wireless node of claim 15, wherein the SIB2 including the access-barring indicator comprises an indicator to: bar sending an emergency communication by the receiving wireless device, or bar accessing by the receiving wireless device another non-emergency service, or any combination thereof.

17. An apparatus to support positioning of one or more wireless devices, the apparatus comprising:
   means for transmitting, by a wireless node configured as a positioning beacon, a first downlink signal for supporting positioning of the one or more wireless devices; and
   means for transmitting a second downlink signal that inhibits a receiving wireless device, from the one or more wireless devices, from sending uplink signals to the wireless node configured as the positioning beacon.

18. The apparatus of claim 17, wherein the first downlink signal and the second downlink signal are configured according to 3GPP Long Term Evolution (LTE) standards.

19. The apparatus of claim 18, wherein the first downlink signal comprises positioning reference signals detectable by the one or more wireless devices to facilitate location determination based on observed time difference of arrival (OTDOA).

20. The apparatus of claim 19, wherein the wireless node is identified as a reference cell or a neighbor cell to support OTDOA computations using the positioning reference signals transmitted by the wireless node and additional positioning reference signals transmitted by at least one other wireless node.

21. The apparatus of claim 18, wherein the means for transmitting the second downlink signal comprises:

means for generating the second downlink signal with one or more LTE information blocks omitted, wherein the one or more LTE information blocks omitted include: a master information block (MIB) for a corresponding LTE cell, a system information block one (SIB1) for the corresponding LTE cell, or a system information block two (SIB2) for the corresponding LTE cell, or any combination thereof; and means for transmitting the second downlink signal with the one or more LTE information blocks omitted.

22. The apparatus of claim 18, wherein the second downlink signal comprises:
 a system information block one (SIB1), wherein the SIB1 includes a closed subscriber group (CSG) indicator and a CSG identifier to which none of the one or more wireless devices belong.

23. The apparatus of claim 18, wherein the second downlink signal comprises:
 a system information block two (SIB2), wherein the SIB2 includes an access-barring indicator.

24. The apparatus of claim 23, wherein the SIB2 including the access-barring indicator comprises an indicator to: bar sending an emergency communication by the receiving wireless device, or bar accessing by the receiving wireless device another non-emergency service, or any combination thereof.

25. A non-transitory computer readable media, to support positioning of one or more wireless devices, programmed with instructions, executable on a processor, to:
 transmit, by a wireless node configured as a positioning beacon, a first downlink signal for supporting positioning of the one or more wireless devices; and
 transmit a second downlink signal that inhibits a receiving wireless device, from the one or more wireless devices, from sending uplink signals to the wireless node configured as the positioning beacon.

26. The computer readable media of claim 25, wherein the first downlink signal and the second downlink signal are configured according to 3GPP Long Term Evolution (LTE) standards.

27. The computer readable media of claim 26, wherein the first downlink signal comprises positioning reference signals detectable by the one or more wireless devices to facilitate location determination based on observed time difference of arrival (OTDOA).

28. The computer readable media of claim 26, wherein the instructions to transmit the second downlink signal comprise one or more instructions to:
 generate the second downlink signal with one or more LTE information blocks omitted, wherein the one or more LTE information blocks omitted include: a master information block (MIB) for a corresponding LTE cell, a system information block one (SIB1) for the corresponding LTE cell, or a system information block two (SIB2) for the corresponding LTE cell, or any combination thereof; and
 transmit the second downlink signal with the one or more LTE information blocks omitted.

29. The computer readable media of claim 26, wherein the second downlink signal comprises:
 a system information block one (SIB1), wherein the SIB1 includes a closed subscriber group (CSG) indicator and a CSG identifier to which none of the one or more wireless devices belong.

30. The computer readable media of claim 26, wherein the second downlink signal comprises:
 a system information block two (SIB2), wherein the SIB2 includes an access-barring indicator.

\* \* \* \* \*